(12) United States Patent
Weber

(10) Patent No.: US 6,636,273 B1
(45) Date of Patent: Oct. 21, 2003

(54) REMOTE CONTROL DEDICATED KEYBUTTON FOR CONFIRMING TUNER SETTING OF A TV SET TO A SPECIFIC CHANNEL SETTING

(75) Inventor: Harold J. Weber, Centerville, MA (US)

(73) Assignee: Savvy Frontiers Patent Trust, Centerville, MA (US)

( * ) Notice: Subject to any disclaimer, the term of this patent is extended or adjusted under 35 U.S.C. 154(b) by 442 days.

(21) Appl. No.: 09/774,529

(22) Filed: Feb. 1, 2001

(51) Int. Cl.[7] ................................................. H04N 5/44
(52) U.S. Cl. .................. 348/734; 348/725; 340/825.69; 340/825.72
(58) Field of Search ................................. 348/734, 725, 348/552, 553; 340/825.69, 825.72, 825.56, 825.22, 5.1, 5.2, 5.8; 455/352, 355, 92, 3.03, 3.04, 151.2, 186.2; 725/37, 38; 379/102.03; 341/176; H04N 5/44

(56) References Cited

U.S. PATENT DOCUMENTS

| 4,021,756 A | | 5/1977 | Podowski et al. |
| 4,377,006 A | | 3/1983 | Collins et al. |
| 4,425,647 A | | 1/1984 | Collins et al. |
| 4,482,947 A | | 11/1984 | Zato et al. |
| 4,774,511 A | | 9/1988 | Rumbolt et al. |
| 5,046,093 A | * | 9/1991 | Wachob ...................... 380/241 |
| 5,175,538 A | * | 12/1992 | Kurita .................... 340/825.69 |
| 5,414,426 A | | 5/1995 | O'Donnell et al. |
| 5,600,711 A | * | 2/1997 | Yuen ..................... 379/102.03 |
| 5,815,297 A | * | 9/1998 | Ciciora ....................... 398/112 |
| 6,002,450 A | * | 12/1999 | Darbee et al. .............. 348/734 |
| 6,094,239 A | | 7/2000 | Weber |
| 6,130,726 A | * | 10/2000 | Darbee et al. ............... 348/734 |
| 6,246,441 B1 | * | 6/2001 | Terakado et al. ........... 348/552 |
| 6,396,549 B1 | * | 5/2002 | Weber ........................ 348/734 |
| 6,545,722 B1 | * | 4/2003 | Schultheiss ................. 348/734 |

FOREIGN PATENT DOCUMENTS

| EP | 1083745 A | * | 3/2001 |
| JP | 02260775 A | * | 10/1990 |

OTHER PUBLICATIONS

"The Remote Control" by Curt Wohleber, *Invention & Technology* magazine, pp 6–7, Winter 2001.

"Encoder and Decoder Pairs", (MC145026, MC145027, MC145028, SC41343, SC41344), Motorola Semiconductor Corp., Document No. MC145026/D (c)1995 Motorola Inc., pp 1–19.

* cited by examiner

Primary Examiner—Sherrie Hsia

(57) ABSTRACT

Portable remote controller for accessory television devices for program channel selection and other operating functions. A single uniquely identified keybutton enables the viewer to remotely reset a televisor's video input to an "unused" channel such as channel 3. After a reset, the remote controller's functions revert to whatever device was previously selected. A variation provides that intentional pressing of a a "device selection" button, such as a CBL "cable box select" button, for a few seconds implements the input reset mode to automatically urge a specific video input selection. Another variation senses an extent of a TV or other device's "select" keybutton action. A partial depression of the TV keybutton may merely initiate the usual device selection function. By further depressing the TV keybutton a preceptive wireless signal is automatically sent to remotely affirm the appropriate video input selection.

20 Claims, 19 Drawing Sheets

REMOTE CONTROL DEDICATED KEYBUTTON FOR CONFIRMING TUNER SETTING OF A TV SET TO A SPECIFIC CHANNEL SETTING

PROBLEM OVERVIEW

A hand held remote control is a popular accessory widely used with many types of contemporaneous entertainment equipment, such as television sets (a "televisor"), cable TV converters ("cable boxes"), satellite receivers, DVR-machines and VCR-machines. Remote controls are produced in many variations by Universal Electronics, Inc. (Cypress, Calif.), Recoton Corp. (Lake Mary, Fla.) and a number of notable brand name makers such as Daewoo, Emerson, GE, Gold Star, Magnavox, Panasonic, Philips, Quasar, RCA, Samsung, Sanyo, Sharp, Sony, Toshiba, Zenith and others. There are also many makers of "private label" controls.

EARLY REMOTE CONTROL METHODS

About 1950 Zenith Radio Corporation introduced what is purported to be the "first remote control", at least for a television set. It was then called the "Lazy Bones" station selector and consisted of little more than a thumb operated switch located on the end of a long length of cable connected to the television set. Inside the television set, the control operated a geared-down motor that mechanically stepped the tuner through the then-common 12 or less possible channel tuning positions. Some versions provided for a motor driven volume control.

By 1955 Zenith Radio had advanced the art to introduce a wireless remote called the "Flash-Matic" which included a handheld remote control that looked like a "ray gun" and it was simply pointed at any one of several photocells, where one was located at each corner of the screen. The remote would urge the television set to change a channel or change volume level and even turn on and off in response to these light beam commands. The choice of action depended upon which "corner" of the screen the "ray gun" remote control was aimed at. However, the remote was unpredictable in behaviour due to the light beam not being encoded and therefore, the photocells were susceptible to interference from stray light sources such as table lamps and sunshine.

To overcome these objectionable difficulties, Zenith Radio next introduced a highly successful ultrasonic "Space-Command" remote control in 1956 and by 1959 most of the major television makers were offering some form of ultrasonic remote control. This early form of ultrasonic remote control depended upon a different ultrasonic "tone pitch" for each function. In the early Zenith Radio controls, the ultrasonic "note" was simply "sounded" by a mechanical contrivance striking a metal tube, somewhat like a door chime arrangement. It was not otherwise encoded and therefore continued to be susceptible to interference from other sources such as the jingling of keys, squeaks, whistles and horn blasts. As time passed, Zenith Radio and others introduced all-electronic ultrasonic remote controls an example of which is discussed by Podowski, et al in U.S. Pat. No. 4,021,756. In spite of the various shortcomings experienced by users of ultrasonic remote controllers, for about 25 years, the ultrasonic operated remote control technique reigned supreme.

About 1980 the infrared remote control gained popularity. Inspired by the opportunity for providing an interference-free digitized transmission of commands using uniquely binary pulse encoded signals, the infrared remote control quickly dominated the remote controller market. The well defined carrier (e.g., a light beam) enabled sophisticated modulation of highly encoded digital format command signals. An early example of this better technology was manifested by the Motorola MC145026P encoder ordinarily used together with the companion MC14527P or MC14528P decoder. Techniques improved and the market expanded and matured, demanding far more functions with a level of reliability and convenience never even dreamed of when the original "Lazy bones" was introduced. Acceptance of a remotely controlled television set was furthered by the rapid improvements in television set technology during the '70s and '80s. For example, televisions of that era introduced fully semiconductor operation with enhanced operational stability. Automatic frequency control was introduced and rapidly became a virtually universal feature in the new tuners introduced during that period. Gone were fine-tuning controls, horizontal and vertical hold controls and other nuisance aspects of early televisions of the '50s and '60s. Today's remote controls contain dedicated microprocessor circuits that, together with various combinations of RAM and ROM, give the user considerable flexibility in command function choices for an ever-widening array of remotely controlled apparatus.

ENCODED LIGHT BEAM SIGNAL SENDS COMMAND

All modern remote controls are utilized in essentially the same manner. A numerical channel selection entry or other multiple-keystroke command is simply (but not necessarily conveniently) entered into a keypad "one keystroke at a time" through finger actuation of a keypad's numerical digit and function keybuttons. Each individual keybutton entry normally initiates an immediate sending of an encoded infrared beam as a command to any presently selected one of usually several available entertainment equipment devices.

Various command encoding schemes for use with an infrared (invisible) light beam have been around for a long time. In an earlier U.S. Pat. Nos. 4,377,006 and 4,425,647 for "IR Remote Control System" Collins et al introduces transmitting an infrared light beam encoded with instructions for controlling the functions of a television set. This is one of the earliest applications of infrared remote control intended specifically for enabling a user to adjust a televisor's settings. These teachings also show the use of a redundant signal encoding technique intended to encourage error-free operation, in spite of a presence of extraneous interference.

There are many commonplace arrangements of televisors and associated devices, such as video cassette recorder (VCR) machines, digital video recorder (DVR) machines, satellite receivers and cable boxes. One mutual thread in their usual hookup is that the cable box or VCR-machine "works ahead of" the televisor. In other words, the cable box or VCR-machine, or other ancillary device, is linked to the televisor, usually with a short length of coaxial cable. A widely held practice is to preset the output signal provided from the cable box or VCR-machine to one of an usually "locally unused" or "empty" channel 3 or channel 4. As a result of this determination, the input to the televisor must be specifically tuned to the same channel as the output signal to be compatible.

Several commonplace arrangements of televison viewing devices appear in Table I.

TABLE I

| Device A | Device B | Device C | Device Linking |
|---|---|---|---|
| R-T | — | — | — |
| T | C-R | — | C > T |
| T | V-R | — | V > T |
| T | V | R-C | C > V > T |
| T | V | — | — | where:
R = Receiver (real or virtual)
T = TV Set or "Televisor"
C = Cable Box
V = VCR or DVR machine (or equivalent)

In this Table I, a receiver (R) may be a cable box (C) or the receiver front-end of a VCR-machine (V), for example. It may also represent the receiver portion of a home theater system. The VCR-machine (V) may also represent a DVD machine, or other ancillary device such as a DVR-machine or delayed playback machine. The cable box (C) may reasonably include a satellite receiver, or similar apparatus. The "linking" suggests the intercoupling of the local video channel (e.g., channel 3 or 4) between devices. The arrangement C>V>T means the output of device C (e.g, cable box) is coupled to an input of device V (e.g., VCR-machine) whilst the output of device V is coupled with an input of device T (the televisor).

Most particularly, when a television set (T) and a cable box or a VCR-machine are utilized together, the remote control may be used to change channels on one or the other piece of equipment that is used as the "virtual receiver" (R). By virtual receiver, I intend to identify the device that acts as the determiner of the incoming program content signal channel selection and usually channels laying between channel "2" and channel "99" in typical cable systems, or between channel "2" and about channel "60" in "over the air" broadcasting. It may also include three digit program channel selections above channel "99" used with many satellite receivers and some cable systems.

In these commonplace arrangements shown in Table I, in each combination except where the televisor serves as the receiver (R-T), either the cable box or the VCR-machine serves as the remotely tunable program selecting "receiver" (R) (e.g., "virtual receiver"), usually by delivering a replication of the desired program content (video content) on a fixed and ordinarily "lower" intermediate channel.

Cable boxes, VCR-machines and satellite receivers are commonly used in various combinations with televisors to enable a user a wide range of viewing options. A more contemporaneous arrangement may include a DVR (digital video recorder) machine instead of (or substituted for) the VCR-machine.

INTERLINK USING SUBCARRIER CHANNEL

A well known and common device interlinking practice is to specifically set the TV set tuning selection to channel 3 (or sometimes channel 4) to match up with the intermediate channel signal delivered from the cable box or VCR/DVR-machine output. It remains urgent that the TV set remain set to the specific intermediate channel selection (e.g., channel 3 or channel 4) when the incoming program signal selections are changed between available program source channel preferences, for example channel 27 or 39 or 73 or 05.

To perform this feat with the usual type of remote control arrangement requires that the viewer press the "TV" button, press channel selection keybuttons "0" plus "3", then press the "CBL" button and enter the channel choice, as for example digit keybuttons "2" plus "7" for the channel 27 preference.

This is the point where confusion sets-in with operation of the usual remote control. So-called "universal" remote controls are particularly susceptible to user confusion and aggravation. In the commonplace incident where the user forgets to press the "CBL" button after specifically setting the necessitous TV channel 03 selection, the TV set ends up being inadvertently and erroneously set to a "wrong" channel other than the necessitous channel 03 setting. Similarly, the user may unwittingly press the "TV" button when intending "CBL" button controlled channel selections.

In other words, the user may mistakenly enter program channel changes erroneously into the TV set's tuner rather than correctly into the cable box tuner. This results in obvious difficulty, because the present program is lost and the desired program is not found. Often the result is a screen full of "snow", or a confusingly "wrong" channel selection with no apparent correlation between the intended selection and the setting of either the cable box or the TV set. User frenzy sets in and often the viewer ends up confused as to why he is getting the wrong program, if any at all. The result is missed program content.

Available remote controls lack a simple and quick way for a viewer to quickly correct this problem brought about by having inadvertently "moved" the TV tuner setting to a "wrong" channel. This convenience has long been overlooked by makers of remotely controlled entertainment devices. As a result, viewers frequently miss an important "beginning portion" of a movie or "opening action" of a sports game due to the time consuming need to "figure out" what is wrong. This sometimes even requires the assistance of others having more familiarity with what the problem is.

ELDERLY USERS

Virtually all prior art remote controllers, with the possible exception of that which is shown in the prior U.S. Pat. No. 6,094,239 categorically lack offering a convenience of operation for their use by elderly users or senior citizens. Observation and experience suggests that, in view of the aging of the general population, an increasing number of users must necessarily endure a limited capability for achieving foolproof operation of a televisor when used with other apparatus, such as a cable box, satellite receiver, VCR machine and so forth. As a result, the senior citizen user is often faced with the confusion caused by having mistakenly changed the televisor channel tuning away from the necessitous channel 3 setting while trying to change the incoming program channel settings on a cable box or other device. The extent of this confusion varies, but it is often accompanied by a compromise where the senior user may "stick with" the same channel most of the time, out of an unnecessary fear that to any attempt to change channels will screw everything up.

In my earlier invention, shown in my U.S. Pat. No. 6,094,239 for "Remote Control for a Television Enabling a User to Enter and Review a Channel Selection Choice Immediately Prior to Sending an Encoded Channel Selection Command to the Television", I discuss (among other points) the issue of maintaining a TV set tuning fixed on channel 3 (or channel 4) to match the signal provided from the typical output of a cable box or a VCR-machine. In this earlier invention, I do address the long-standing need to more effectively confirm and reaffirm the correct tuning relationship between a televisor and a cable box or VCR-machine, especially when used by the technically inept, physically challenged or elderly viewer. In this earlier invention, I attain this affirmative step by sending a duplex remote command signal. In other words, with each entry of a channel change command to the cable box or VCR-machine (for example, a viewer entered change to channel 14) a concurrent channel 03 channel affirmation command is automatically sent to the televisor. This duplex sending of the televisor's channel 03 command is made transparent to the viewer, assuring that the televisor's tuner is, in fact, kept tuned to channel 03 (or, optionally channel 04 in some cases). Remember that the submission of the VCR-machine channel change command and accompanying channel 03 predicative setup of the televisor is obtained by the user's initiation of the SEND or LINK keybutton command. This additional step gives the user an opportunity for aligning the remote controller with the remotely controlled device before sending the commands.

A manual procedure for correcting a "messed up" current art combination of televisor (e.g., TV set) and cable box when trying to receive program content incoming on channel 26 (for example) necessarily includes these various manually expressed steps:

| STEP | ACTION | RESULT |
|---|---|---|
| 1 | Press "TV" Keybutton | Places Remote in TV Mode |
| 2 | Press "0" Keybutton | Sends value "0" to TV Set Tuner |
| 3 | Press "3" Keybutton | Sends value "3" to TV Set Tuner (TV Set tunes to Channel 3) |
| 4 | Press "CBL" Keybutton | Places Remote in Cable Box Mode |
| 5 | Press "2" Keybutton | Sends value "2" to Cable Box |
| 6 | Press "6" Keybutton | Sends value "6" to Cable Box (Cable Box tunes to Channel 26) |

With reasonable luck and patience, this sequence will have changed the televisor input tuning to Channel 3 to match the fixed (preset) channel 3 signal delivered from the cable box and it will further have changed the cable box tuning to channel 26 allowing receipt of the desired "channel 26" program content.

The problem overview concludes that the mistuning of a televisor and cable box or VCR-machine combination is a commonplace problem which nearly every TV viewer encounters at one time or another. More particularly, the mistuning issue becomes a paramount inconvenience issue for elderly persons and persons who are physically or mentally challenged for one reason or another. On another front, mistuning of a televisor in relation with a cable box becomes problematic for virtually anyone when usage is attempted in a darkened viewing room, or while under the influence of medications or an alcoholic beverage.

In another U.S. Pat. No. 4,774,511 for a "Universal Remote Control Unit" inventors Rumbolt et al present a hand held remote control intended for use with any of a variety of television sets, VCR-machines, disk players and other devices. It also discusses the advantage afforded by sending a concurrent command for switching the television set to an "empty channel to be used for display" when the VCR-machine's "play" command is sent. However, this invention is silent regarding any utilization of a separate acting "SEND" or "LINK" function initiating keybutton or even a virtual function acting as a "SEND" function. This earlier invention merely sends the "unused channel" selection command essentially concurrent with a sending of the "play" command to the associated VCR-machine immediately upon a pressing of the "PLAY" keybutton, whether or not the user has had time to move the remote controller from a viewable position to a position suitable for wireless (light beam) sending of the command. This is one of the problematic situations which my present invention corrects.

INTERLINKING USING VIDEO DATA SIGNALS

Contemporary televisors are often equipped with direct video input connections, which interpret to mean that the video data is not superimposed on a subcarrier such as channel 3, but rather it is simply the basic video signal itself. This type of connection is most commonly encountered when connecting between a "digital" televisor, when used with a DVD-player or DVR-machine, as well as direct-digital satellite receivers and similar devices. It is also quite common in home theater hookups.

As with the analog counterpart, where channel 3 interlink settings must be maintained, the direct video inputs may also require a maintained setting. For example, a digital televisor may offer selection of more than one input connection which needs to be selected between.

In the practice of my invention, I mostly discuss the resetting of a televisor to the analog composite video signal modulated channel 3 (or channel 4) interlink setting. You must realize that the same automatic reassertion of essential intercoupling settings may be vitally obtained using my invention's automatic scheme for reconfirming essential setup states in the televisor, as well as other devices. Therefore, realize that my discussion of interlink reassertion methods and related teachings directed generally towards the automatic resetting of the interlink video signal to a necessitous "channel" is equally applicable to automatically reaffirming that the interlinking direct video signal input settings are in fact set to the necessary states.

BACKGROUND OF MY INVENTION

Cable and satellite originated television reception is nearly ubiquitous in today's modern home. In the usual arrangement, a cable box or satellite signal receiver is coupled with an ordinary television set (or televisor). In such an arrangement, an incoming program source signal coupled with the cable box input may be presented on a specific channel, usually set between channels 2 through 99, more or less. Usual practice is to convert the viewer-selected incoming program source's cable channel originated signal into an intermediate "video" channel signal.

It is typical practice for this intermediate video channel signal to be preset to a fixed carrier frequency coupling signal interlinked between the cable box output and the televisor input. Usually this interlinked coupling signal is preset to a locally "vacant" VHF channel and ordinarily one of either channel 3 or channel 4. Similarly, when a satellite receiver is utilized it may down-convert the incoming satellite signal (which may similarly span many channels) into a similar preset fixed-channel intermediate signal. Conversely, in either arrangement a direct video signal connection may establish the interlink coupling.

Video cassette recorder (VCR) machines are nearly universal in the modern home. VCR-machines have several distinct operating modes. The primary betterment concerned with in this invention involves the ability for the VCR-machine to receive an incoming cable (or antenna) originated signal usually between channel 2 and channel 99 (or higher) and adapt it to that of the intermediate channel signal, similar to the operation of a cable box. In effect the VCR-machine becomes not only a recorder, but a "pretuner", or a "receiver ahead of the TV set", in effect the "virtual receiver" mentioned earlier. Normally, the user utilizes the VCR-machine to select a preferred program channel typically selected between channel 2 and channel 99 (or higher) in this hookup. The incoming signal is then down-converted to the intermediate channel carrier frequency (e.g., channel 3 or 4) and coupled with the televisor input. This arrangement enables a viewing of program content prior to or simultaneously with recording the program. Viewing the incoming program signal on the televisor screen is the most practical way to determine if the program being recorded is, in fact, the program desired to be recorded. Furthermore, viewers often content themselves with solely using the VCR tuner as their program tuner even when not recording, thereby always leaving the televisor set on the interlink channel such as channel 3.

The other VCR-machine operating mode of interest is where the playback of a previously recorded video tape results in a modulated intermediate channel carrier frequency signal interlinked from the VCR-machine output to the television set input. In this mode, the VCR-machine usually delivers the tape playback signal modulated on the intermediate channel carrier signal, or interlink signal, usually preset to either one of channel 3 or channel 4.

It is well known that cable boxes and VCR-machines typically have an owner accessible "selector switch", "setup switch" or the like (usually on their rear panel) which is presetable to either one of channel 3 or channel 4 by the user during initial system hookup. It is this "preset switch", or an equivalent arrangement, which determines the intermediate channel frequency for program content transferred between the VCR-machine output or cable box output, and the televisor input. This is a local video interlink signal, usually maintained on a fixed carrier frequency determined by the internal workings of the VCR-machine or cable box electronics.

In order for the television set to operate properly with these several arrangements, it is fundamentally necessary that the televisor's input tuner be set to and absolutely kept tuned on the same channel as that of the preset intermediate channel (or video interlink signal) originated by the "cable box", VCR-machine or other apparatus. In other words, it is of utmost importance that the user keeps the televisor tuned to channel 3 (or channel 4) for satisfactory viewing.

For example, if the cable box is set to tune an incoming program on channel 9 and the cable box "output" intermediate channel signal is preset to channel 3, the televisor tuning must be maintained set to channel 3. When the user changes the incoming program selection on the cable box from channel 9 to channel 63 (for example), the television tuning must assuredly remain set on channel 3. If the user inadvertently alters the televisor tuner setting, lets say by mistakenly resetting the televisor input to channel 5, the resulting mismatch between the cable box channel 3 output and the televisor's erroneous channel 5 setting is ordinarily enough to interrupt television viewing or at least it will shift the incoming channel selections where a setting of the cable box to channel 63 may result in receiving a program from some incoming signal channel other than channel 63. At best, the result is merely annoying until the user realizes his error in changing the televisor setting from that of channel 3 to channel 5. At worst, the user may incur the cost of an unnecessary service call because "something appears to be wrong with the television set".

PROBLEMS WITH CURRENT ART

In the "real world", it is not at all unusual for a viewer to accidentally change the television channel selection, for example from the necessitous intermediate signal channel 3 setting, to an erroneous channel setting, such as channel 6, 15 or 39 for example. This misbecoming state can occur for a variety of reasons, including:

1)—The extraordinary complexity of keypads on many "universal" and OEM remote controls confuses the viewer, especially when the viewer is elderly, visually or physically handicapped, bewildered by medications or intoxicants, or simply trying to use the remote control in a dimly lit viewing room;

2)—Several different "original equipment" remote controls are needed to operate the television and VCR-machine or cable box. For example, one remote control is needed to turn the televisor on and off and adjust volume, or other viewing parameters such as brightness, etc. A second remote control is then needed to select a preferred incoming program channel on the cable box, VCR-machine or whatever other accessory device is involved. Obviously this requirement for more than one remote control can, in and of itself, lead to confusion and of course resetting the intermediate channel selection for the televisor to a "wrong channel", say rather than the necessitous channel 3 is quite likely to occur. Most commonly this happens merely because the viewer picks-up the wrong remote control and begins to enter channel changes which for example may mistakenly tune the televisor to an erroneous channel other than the necessitous channel 3 (or channel 4).

3)—A handheld "universal" remote controller may be used which is intended to replace two or more manufacturer's original equipment remote controls. A typical universal remote control, such as a RCA "SystemLink-4" Model RCU1400VP, includes four buttons marked TV, VCR, CABLE and AUX. Pressing the appropriate button places the remote controller in each of the available modes in order to operate with the associated televisor or accessory apparatus. Other remote controls, such as the SANYO "Moonlight" Model RMT-U100 and the Universal Electronics Inc. "One-For-All" Model 2060 operate in a similar manner and thus they afford equivalent mechanisms for introducing user error. Quite simply it is the obvious likelihood that pressing the "wrong buttons" may introduce the "wrong operation". Extend this to the usual real life setting found in a dark room, maybe including distractions. Add eyesight limitations and age issues and every chance for mistaken operation is present. The result is attempted operation of a cable box or VCR-machine with a televisor, while the televisor is set to the wrong intermediate channel choice. The combinatorial consequence is mixed up operation, wrong channel selections or perhaps just a snowy screen with no picture at all.

While "resetting" the televisor back to the necessitous interlink channel 3 (sometimes called the "video channel") is an obvious technique for overcoming this problem, it is not a practical answer in many everyday situations. For example, when a spectator sports event (e.g., a football game or the like) is underway or when a movie or similar program is about to begin, the erroneous mistuning of the televisor to the wrong intermediate channel setting (e.g., something other than channel 3) can lead to an onset of frenzy in a frantic attempt to "get everything running again" without lapse of program content.

As a result, the viewer may miss an essential portion of his program, such as a significant "play" in a football game, a "knockout punch" in a boxing match, a news item at the beginning of a news program, or a revealing sequence in a movie plot.

DIRECT VIDEO SIGNAL COUPLING

Contemporary arrangement for intercoupling a satellite receiver, a DVR-machine, a "set-top box" (aka, "cable box"), a DVD-player machine and similar devices often employ direct video signal level interface. In other words, the interface is obtained without modulation of a carrier (such as the mentioned channel 3 or channel 4). This arrangement is particularly found in "home theater" setups, where premium quality televisors are used. Sometimes in this home theater environment, the viewer "watches" a large screen (or even projection) monitor which does not include a tuner. A separate tuner is used, which is usually sporting many viewer oriented features.

A selection of a specific combination of various devices does not conform with the usual practice of "matching channels". It is not unusual for a televisor to have provision for selecting any one of a number of different input sources. Obviously, it is necessary that the selected televisor input matches the sourced video signal.

In practical terms, the "normalization" of the televisor input is equivalent to the affirmative selection of a particular channel, in-so-far as everyday operation of the equipment is concerned. Therefore it must be considered that what I describe as pertinent to establishing a particular interlink channel selection (e.g., channel 3 or channel 4) applies with equal force to establishing a necessitous input selection such as "input 1" or "input 2". In other words, selecting an interlink input is fully equivalent to selecting an interlink channel, in-so-far as the applicability of my teaching is concerned.

FIELD OF MY INVENTION

My invention generally pertains to televisors, cable boxes, VCR-machines, DVR-machines and similar equipment ordinarily used in conjunction with a hand held remote control for establishing their convenient operation. My invention further pertains to wireless remote controllers of all types and in particular to portable or hand-held remote controllers commonly used for remotely entering changes in the channel selection commands into various combinations of televisors, VCR-machines, DVR-machines, satellite receivers and cable boxes.

For purpose of this invention, the term televisor refers generally to a television receiving apparatus, sometimes called a TV set. Televisors are video displays having tunable inputs which may typically select any one of dozens of channels representing analog format or digital format video signals modulated on a channel related carrier frequency. Normally the video signals include various categories of program content of interest to the viewer.

More pointedly, my invention pertains to the necessity for maintaining a concurrent synchronization of requisite "video channel" settings for the carrier frequency interlinked between a TV set and any of a plurality of apparatus hooked together in an operational group. In the most common arrangements, the ancillary device such as a cable box delivers an output signal preset on an intermediate carrier frequency and modulated by the selected program content. Usually this intermediate interlink signal (video interlink signal) is centered about the television channel 3 or channel 4 frequencies, as designated by the U.S. Federal Communications Commission. The video interlink signal is ordinarily coupled with the tuner input of the televisor, with the requirement that the televisor be maintained set on a corresponding channel 3 or 4.

SUMMARY

The objectionable consequences of a misadjusted intermediate interlink signal channel selection or video input "source" selection on a televisor is best overcome, in accord with this invention, through the novel expedient of providing a separate, dedicated function button which overrides all other remote control settings to singularly submit a preceptive "channel 3" or "channel 4" selection command to the televisor, or else an "input source" selection command, assuring compatible operation between the televisor input, and the cable box output, VCR-machine or other ancillary device's output signal.

The preprogrammed button, perhaps called "LINK" (as in interLINK setup), is furthermore best (but not necessarily) embodied as a prominent and distinctly positioned dedicated single function button relative with the rest of the remote control keypad button array. This distinction may be attained by its offset position relative to other keypad buttons, key-top color choice and larger keybutton size. Due to the importance of this button's necessary usage to be readily available to quickly confirm proper interlink setup between the cable box output and the TV set input (for one example) it's operation should preferably be absolutely unambiguous in the usual viewer's usage environment. This includes use in a dimly lit room, without reading glasses and while preoccupied or distracted elsewhere (as with program content, etc.).

Upon pressing this LINK button, the remote control's other usual functions are temporarily suspended. Activation of the novel LINK button enables an infrared coupling beam (or wireless signal) to be delivered to the TV set which is the virtual equivalent of pressing the "TV" button, "$\emptyset$" button and "3" button in a rapid-fire sequence. Upon completion, the remote control's immediate device selection mode is automatically returned to whatever device selection mode it was operating in prior to pressing the LINK button (e.g., if it had been in the CBL mode, it returns to the CBL mode which is the virtual equivalent to the user pressing the "CBL" button) thereby enabling viewer directed selection of incoming cable program channels, such as channel "26", etc.

PRECEPTIVE MEMORY

Preceptive memory is a coined term presently referring to data uniquely stored in the remote controller's memory which may constitute the information necessary to construct and send the affirming interlink signal setup command to the televisor or other device. This data is preferably entered beforehand, such as during manufacture of the remote controller, by download from another computer or via the internet from a central computer, or at the very least during initial manual setup of the remote controller by an installer. It is generally preferable that the preceptive data memory be tamper resistant and non-reprogrammable by usually available keypad operations or entry sequences available to the casual user of the remote controller. As a result of this preference, preceptive memory data is best stored in ROM (Read Only Memory) or non-volatile RAM (Random Access Memory), such as flash memory, and battery backup supported RAM.

A DEDICATED UNCTION

The principal purpose of the dedicated LINK button operation is to provide the viewer with a capability for readily and unambiguously establishing a necessitous setting of the TV set tuner to the intermediate video signal channel 3 or channel 4 as required for proper interlink coupling between the cable box and the televisor. My invention's paramount novelty clearly resides in the ability to establish a fully automatic, viewer-initiated sending of a necessitous interlink channel selection to a televisor typically used in conjunction with a cable box, VCR-machine or similar apparatus. The idea is to make sure that the televisor's video signal input is unequivocally set to the necessitous interlink program signal channel Ø3 (or channel Ø4). The amazing part of this feature is that pressing the LINK button sends a "channel Ø3" command suitably encoded to be recognized by the TV set, setting the TV set to channel "3" whereafter the operation of the remote control is immediately returned back to its previous state prior to pressing the LINK button . . . with all the necessary steps remaining utterly transparent to the viewer and with an almost negligible elapse of time.

In a usual remote controller arrangement, the portable remote control device is handheld and is fitted with a keypad having digits 0–9, plus several other commands available as separate keys offering convenient manual keystroke entry by the user. In addition to these usual keys, I include an exclusive LINK or equivalently defined keybutton which is preferably distinctive in position, shape, size or color so as to make it's use readily attainable even under adverse conditions, such as in a darkened room.

In the current art, the remote controller usually submits a selected instruction or channel selection to the associated remotely controlled apparatus as a wireless command signal, encoded for exclusive recognition of the function associated with the controlled apparatus. To accomplish this feat, the remote controller is ordinarily fitted with a read-only memory (ROM) which holds a library of code sequences for a variety of possible TV-sets, cable boxes, VCR-machines or other devices which might be controlled by a user. Conversely, the remote controller may be fitted with a non-volatile random access memory (RAM), noting that a common volatile static RAM may be made virtually non-volatile by merely utilizing a backup battery or the like. Similarly, the RAM may take the form of a "FLASH" memory or it's equivalent. Such use is known, typically found in the so-called "learning remotes" where the code data may be downloaded from another remote, a computer system or sometimes by internet connection.

Common remote controls of the infrared beam type (and by far the most popular class) typically send a modal code sequence having a distinctively different signature for each the TV set and the cable box. Considerable effort is usually provided to minimize interference between the recognition code of one device such as the TV set and another device such as the cable box or VCR-machine.

In commercial practice, these unique modal codes are usually identified as 3-digit or 4-digit numerical codes obtained from a tabulation provided by the remote controller manufacturer. Typically, the device codes (e.g., TV set, VCR-machine, cable box, etc.) are included in a printed manual that accompanies the remote controller when it is purchased. The device codes are then entered during initial "setup" by the installer as a patterned sequence of keypad entries which submit to a local memory in the remote controller. In effect, this procedure customizes the remote controller to work in conjunction with one or more particular devices, such as a televisor and other ancillary devices.

Alternatively, most makers offer internet access via a proprietary website in which they may list the pertinent codes and any updates to the code list. However, the "printed" numerical code is merely an identifier and the actual encoding signal delivered by the remote controller is far more complex in its pulse train encodement.

SENDING A "LINK" COMMAND

A standard remote control which has been enhanced to include my invention becomes in reality, at least a "two device" controller. This means that it utilizes one signature code to hail the TV set and another for the cable box (or VCR-machine).

By way of example with this form of prior art a modal code represented by 1324 may be selected for a TV-set and a modal code represented by 2314 may be used for a cable box. In the remote's usual use for selecting incoming program signals through the cable box, the modal code 2314 weighted by a unique function selection code, such as "5" as a first channel selection digit entry, is usually sent to the cable box to establish the viewer's desired changes in the cable box selections or settings.

Including my invention enables a unique operating sequence where, upon pressing the LINK button a sequence of encoded signals read from a preceptive memory are sent that override any other preexistent device selection instruction and immediately signal the televisor to be selected and tuned to the necessitous interlink channel and usually designated as one of channel 3 or channel 4.

Typically the sequentially encoded wireless command signal comprises a signal train where the modal code 1324 weighted by 0 precedes a sending of the modal code 1324 weighted by 3. The virtual command sent to the televisor is equivalent to the viewer having pressed the "TV" key, the "Ø" key and the "3" key in succession. The result is the affirmation of a channel 3 setting of the TV set tuning.

But wait! More happens. After selecting the televisor and affirming its channel selection is set to channel Ø3, the remote controller automatically returns to whatever device selection preexisted the pressing of the LINK button. The user's immediate perception is that no change in his manual entry process has taken place. And in a practical sense, he is right.

For purpose of this discussion, the term "weighted by" implies that the modal code which serves to select the TV set or other device is modified, usually by extension, to produce an encoded signature command signal which not only determines the device selection but also the command which is to be implemented in conjunction with the device.

My teaching utilizes the mention of a device selection code "weighted by" a particular command, such as a channel selection value. This is a generalized term signifying practice well known in the art of remote control, where the device selection code is a particular data set identifying the televisor or other device by it's maker's encoding scheme. In other words, the device selection code is uniquely distinct for a Sony televisor as opposed to a Toshiba televisor or a Sanyo VCR-machine. "Weighted by" means a specific command, such as the digit "7" to select a channel is "tagged onto" or otherwise combined with the device selection data and the resulting combination is sent to the televisor or other selected apparatus to instill the wirelessly sent function as an action step in the selected apparatus. In other words, "weighted by" infers the preestablished instruction for achieving a combining of two unique data segments to deliver a third combined data signal to the selected apparatus. This is well known practice and the underlying objective is to adapt these variously known encoding schemes to include operation with these teachings.

A REAL-WORLD PROBLEM

Only a correspondingly weighted modal code is sent for each selected mode. For example, if the remote controller is set to the cable box mode by having pressed the "CBL" key and a keypad entry for channel "57" is submitted by the user, the remote control signal sent to the remotely controlled cable box is submitted as the code 2314 weighted by 5 followed by the code 2314 weighted by 7. As a result, only the cable box responds, setting the INPUT to 57. Nothing more normally happens in this sequence.

However, if the viewer inadvertently entered the channel change numbers without having first pressed the "CBL" key and the remote control was previously used in the "TV" mode, the wrong model code value 1324 would precursor the weighting of the modal code by the channel selection codes and the TV set would be mistakenly tuned to channel 57, instead of remaining (or being set to) the necessitous channel 3.

To efficiently overcome this kind of mixup is a fundamental offering of my invention. In the preceding predicament where the TV has been errantly tuned to channel 57 and the cable box has not been changed, using my invention to straighten out the mess would merely entail:

1) Pressing the "CBL" (cable mode select) key.
2) Pressing the "5" number key.
3) Pressing the "7" number key.
4) Pressing the novel "LINK" keybutton.

Noting further that the step 4) action could alternatively precede the step 1) action. The LINK key may be activated any time, either before pressing a device selection button such as CBL, or after pressing the button. This is possible, because the LINK button overrides whatever other device selection is current and sends the necessary 03 or 04 channel selection encoded command exclusively to the televisor. More importantly, pressing the LINK button does not alter or reassign the previously established CBL device selection.

CONCURRENT MULTIPLE DEVICE CONTROL

Even a submission of a primary command to the cable box to set the channel selection to channel 57, for the mentioned example does not assure correct and proper operation of the cable box in conjunction with the TV-set. For example, if the TV-set is inadvertently set in error to channel 6 and not the necessary channel 3, erroneous performance ensues. Most specifically, the user selected program channel either does not appear or else appears as the wrong program carrying channel. This malfunction is exasperated by the preponderance of contemporary televisors not providing ready readout of what channel they are truly set to. The channel selection is usually presented as a briefly appearing on-screen display, which unfortunately may be simply overlooked or confused with program content. Or whatever! The immediate correction of this malfunction is even more difficult, especially for the technically disinclined and persons who are easily confused, such as the aged. The usual correction consists of changing the remote controller mode from VCR-machine to TV-SET by pressing the TV key, submitting the key press entries 0 plus 3 (e.g., channel 03) for submission to the TV-set. Then the remote controller must be returned to the CABLE box mode by pressing the CBL key and the user desired channel digits must be entered.

Since the different code combinations exist in the remote controller, it is the underpinning novelty of my device to respond to a user's determination for setting the incoming cable program to channel 39 by submitting the cable box recognized command signal 2314 weighted by 3 plus 2314 weighted by 9 concurrently accompanied by the TV-set recognized command code 1324 weighted by 0 plus 1324 weighted by 3. Being sent together enables the cable box to switch to 39 and reasserts that the TV-set input is set to channel 03. Bingo! The necessitous signals coupled between the cable box and the TV-set are set to work harmoniously and bring the user his channel choice as a viewable image.

Extend the essential novelty of my invention further and automatic maintenance of necessitous channel settings for a VCR-machine and the TV-set may be obtained. Using the previous example, in addition to the mentioned encoded signals sent to the cable box and TV-set, an encoded VCR-machine command signal of 3142 weighted by 0 plus 3142 weighted by 3 is simultaneously sent with the other two command sendings.

Obviously my showing is extensible to more than three apparatuses, or by inclusion of a switch for enabling or disabling the supplementary commands. Disablement is merely mentioned as a technique that may be used to enable a more experienced user to exercise full uncompromised control over the inter-equipment necessitous channel settings for whatever reason.

SENDING A SETUP SIGNAL

A best embodiment for my invention is a dedicated "keybutton" function associated with the keypad on the remote controller that may be intentionally actuated by the user. It is the singular purpose for this button actuation to initiate the immediate sending of the necessitous setup command to establish the interlink channel settings (e.g., channel 3 or channel 4). When the user "presses" the dedicated keybutton, an encoded signal representing the interlinking video channel selection for at least one piece of entertainment equipment is "sent". Usually, the encoded signal initiated by pressing the dedicated keybutton is associated with the TV-set. Of course this is not a specific limitation, and the controlled device may be another apparatus other than the TV set, such as the VCR-machine. In effect, the function of the dedicated keybutton actuation is to assert or reassert the necessitous channel setup command. In other words, the interlink channel setup command may be submitted at any time and as a fully independent step from the customary sending of the user's usual program channel selection or other operational preference command. As a functional step, the dedicated keybutton may be embodied as a virtual key function step utilizing the usual device selection key already provided on most "universal" remote controls. In other words, the TV device selection button may be used. Through the operational technique of maintaining the pressed state of the TV device selection keybutton beyond a finite period of time the user's submission of an intentionally maintained TV device selection keybutton actuation becomes recognized as an "initiator" for the sending of the interlink channel setup command signal to the TV set, setting or resetting it to the necessitous channel tuning and usually channel 3 or channel 4. Furtherance of this bimodal functioning of the TV device selection keybutton may be provided wherein the keybutton operates at two distinct key-press levels. An initial press to an intermediate or partial step "level" of actuation simply performs the usual device selection command. A further press beyond the intermediate level step functions as a virtual dedicated key-press function and unequivocally signifies the user's intent to send the interlink channel setup command signal to the TV set.

TWO OR MORE ANCILLARY DEVICES

When the televisor is used together with other devices, such as a cable box and VCR-machine combination, my invention is still able to considerably simplify operation for a user. In such a combination, the cable box output is coupled to the VCR input with a video interlink signal usually on channel 3. Similarly, the output of the VCR-machine is coupled with the input of the televisor, again using a video interlink signal usually set on channel 3. As a result, it is necessary that the input of the televisor and the VCR-machine both be maintained set on the video interlink signal channel 3.

In my remote controller, this is obtainable in one of three convenient ways:

| METHOD I |
| --- |
| 1. Press LINK button to automatically set televisor on channel 3.
2. Press VCR button briefly. Changes LINK button function to VCR mode.
3. Press LINK button to automatically set VCR on channel 3. Releasing LINK button returns LINK button function to TV mode. |

| METHOD II |
| --- |
| 1. Press TV select button and HOLD DOWN for about 2 seconds to automatically set televisor on channel 3.
2. Press VCR select button and HOLD DOWN for about 2 seconds to automatically set VCR-machine on channel 3. |

| METHOD III |
| --- |
| 1. Press LINK button briefly to automatically set televisor to channel 3.
2. Press LINK button and HOLD DOWN for about 2 seconds to automatically set VCR-machine tuning input on channel 3. |

OBJECTIVES

An objective of my invention is to reassert adjustment of a necessitous signal or video channel selection between a television tuning device such as a cable box and a televisor concurrent with each user-submitted change in incoming program channel selection.

A key purpose for my invention is to provide a viewer with a straightforward key function to reestablish a certainty of tuning compatibility between the intercoupling (or interlink) signal frequency output of a program signal tuning device, such as a VCR-machine or cable box and the input tuner frequency setting of a televisor or similar intercoupling signal receiving device.

A further goal is to provide the viewer with a distinctive and preferably dedicated keypad key-press action which may command and affirm the necessitous interlink signal channel setting or tuning setup of the televisor used in conjunction with a cable box or VCR-machine.

It is an important intent to provide the setting and resetting of the TV set input tuning to the usual interlink signal video channel 3 (or 4) without entering a device selection command, such as "TV".

It is a further intent to provide an automatic combination and submission of the device selection codes together with channel selection data by mere actuation of a dedicated keybutton function.

Still another consideration afforded by my invention is to utilize a device selection keybutton typically marked TV and used for the selection of the TV mode may further be urged into the automatic sending of the televisor input tuning command for setting the televisor to the interlink signal frequency by maintaining actuation of the TV keybutton for a longer than usual time and typically over 2 seconds.

Yet a remaining object of my invention is to recognize the user's prolonged pressing of the VCR selection button to exceed a preset time interval and usually about 2 seconds thereby urging an automatic sending of the VCR-machine input tuning command and setting the VCR-machine input to the interlink signal frequency.

DESCRIPTION OF INVENTION

Figure 1:
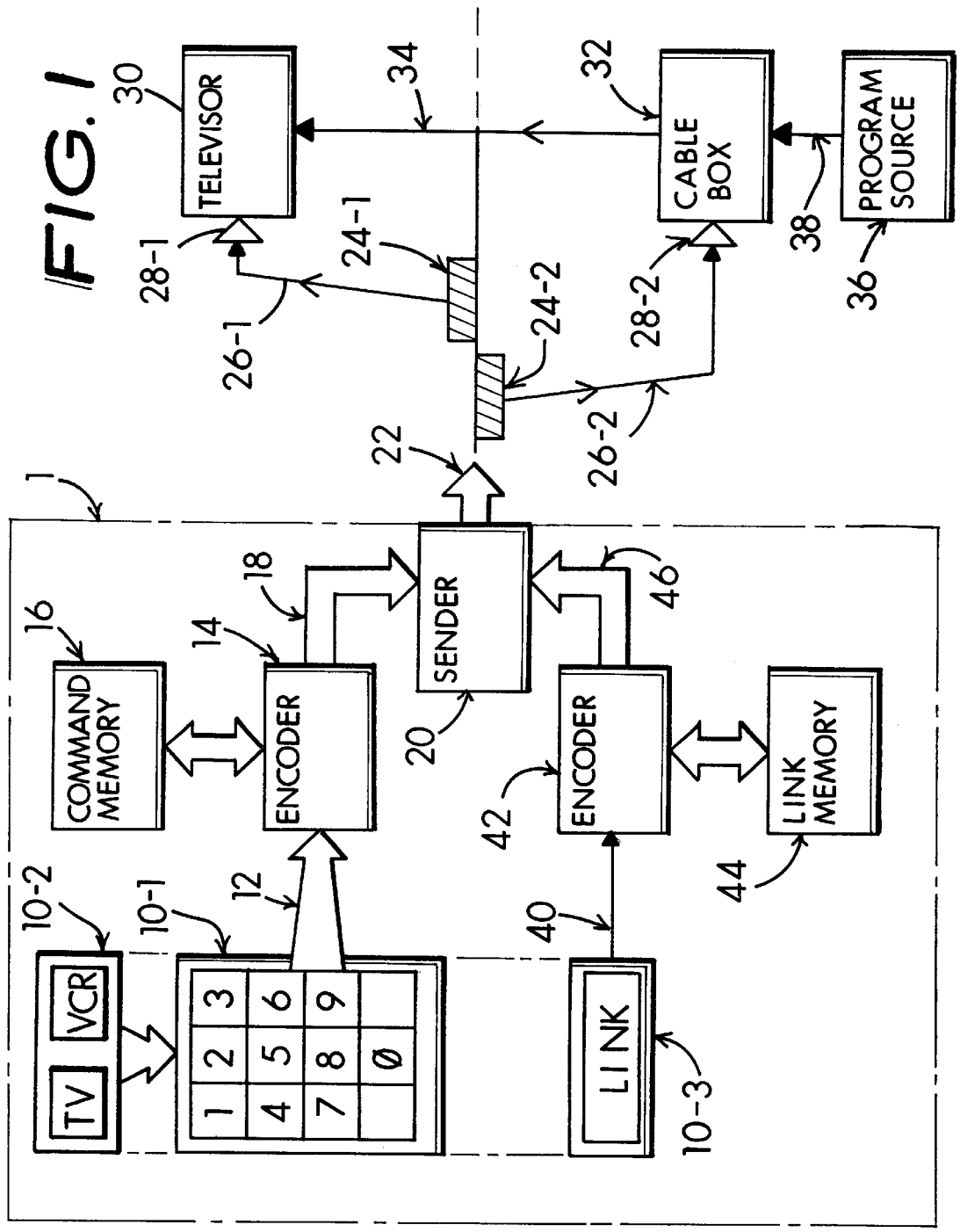
FIG. 1—Overview of a remote controller including a LINK setup command function used with a televisor and a cable box or other device.

A overview of one arrangement 1 for my invention is shown in FIG. 1. A keypad 10-1, which is ordinarily accessible to a viewer or user of the remote control, couples 12 with the input of an encoder 14. It is the role of the encoder to utilize data retrieved from a command memory 16 to:

1. Establish the encoding pattern which may be recognized by a specific controlled device such as a televisor 30 or cable box 32 selected by having pressed one of the keypad 10-2 buttons (e.g., TV or CBL);
2. Define specific instruction patterns on the encoding pattern to translate an entry, such as a channel selection digit, made through the keypad by the viewer into an interpretable instruction command when received by the remotely controlled cable box 32.

The command memory 16 is ordinarily pre-loaded, typically by a maker of the remote controller, to include encoding patterns specific to any number of televisors, VCR-machines, cable boxes, satellite receivers and other apparatus.

The encoded, instruction laden command is coupled 18 with the "remote controller" 20 which is a modulatable wireless signal. For example, the remote controller may be a source of high frequency signal (for example, 38-kilohertz) which is modulated with the encoded command to deliver a wireless signal 22 typically from an infrared light emitting diode or quasi-laser diode. The resulting wireless beam produces two signal bursts 24-1, 24-2 which are wirelessly translated 26-1, 26-2 to and receptive by corresponding input ports 28-1, 28-2 of the televisor 30 and the cable box 32. By way of example, if the user enters a channel command selection sequence 2 and 3 (viz, "23") into the keypad and it is designated to control the cable box, the encoded signal 24-2 embodies the data for particularly setting the cable box 32 to channel "23".

In accord with usual practice, a program source such as a cable provider, etc. 36 delivers signals 38 to an input of the cable box 32. By setting the cable box on the mentioned channel "23", the incoming program represented by channel "23" is converted into an interlink signal an delivered on a coaxial cable 34 or similar connection. Typically the interlink signal is delivered on channel "3" or channel "4", as pre-determined by the user typically by a setting of a slide switch or the like on the backside of the cable box device.

The term interlink signal as henceforth mentioned refers to a signal translation between a first device such as the cable box 32 (or a VCR-machine, etc.) and a second device, such as the televisor 30. In its usual form, the interlink signal is connected via the coaxial cable 34 between the two devices. A radio frequency carrier comprising an intercoupled video signal centered usually on channel 3 or channel 4 and modulated with the selected channel "23" is conveyed from the cable box 32 to the televisor 30. Throughout this teaching, the term video signal more generally includes to this combination of carrier and intercoupled video signal, as well as where the demodulated video signal is translated between the devices.

This previous overview brings forth an operational issue which my invention addresses. I provide a dedicated LINK keybutton 10-3 which delivers an actuation signal 40 to the input of an encoder 42. This encoder function, which obviously may be inclusively incorporated with the encoder 14, utilizes data stored in a preceptive memory 44. The role of the encoder 42 is to construct a dedicate instruction signal on data line 46 which develops the signal component 24-1 translated 26-1 to the televisor 30 remote control input port 28-1. The constructed command signal on the data line 46 comprises three essential components. First, the encoding data format is recognizable by the televisor input port 28-1. Nextly, the encoded data format is modulated with two channel selection digits. Since the usual interlink signal 34 coupled between the apparatus is carried on channel 3, the necessary channel selection digits are "3" preceded by a zero (e.g., "Ø3"). The overall result of this FIG. 1 representation is that a user may pick a program 38 selected through the cable box 32 by entering digits on the keypad 10-1 and also may assure that the interlink coupling between the cable box 32 and televisor 30 is compatibly set on channel 3 by pressing the LINK keybutton 10-3 which automatically reaffirms the televisor tuning to channel 3.

Figure 2:
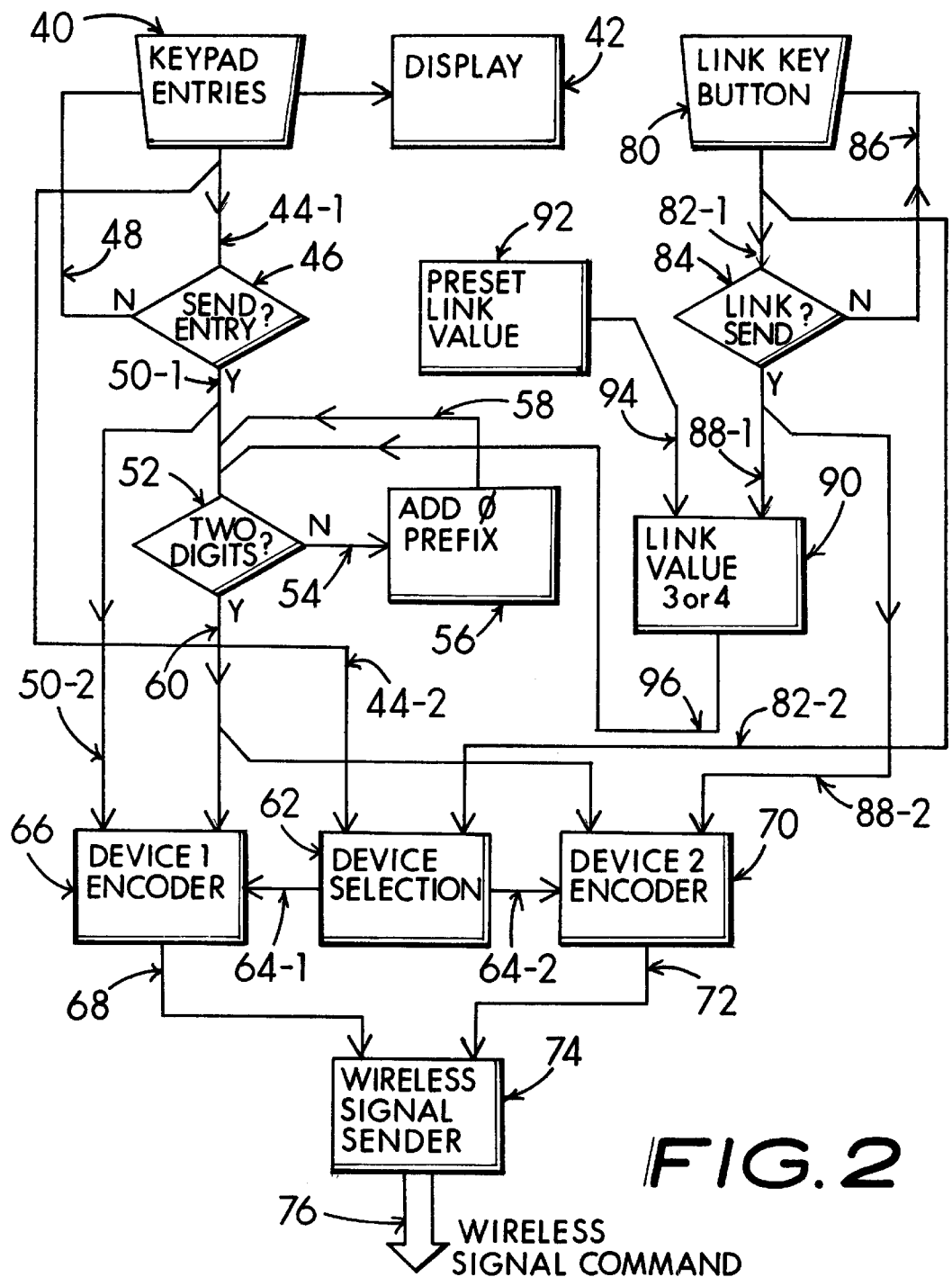
FIG. 2—Functional logic diagram for an embodiment based upon the elements of FIG. 1.

With FIG. 2 I depict a logical representation of signal handling for one possible embodiment for my invention. Clearly realize that this is not alone the sole embodiment for my invention, but merely one particular example from many possibilities for practicing my invention which a clever engineer or skilled artisan may devise. Nor should this or any of the other representations included in this discussion serve to dilute the fundamental novelty of my invention as later claimed.

A user typically submits keypad entries 40 which may be displayed 42 for convenience in verifying the entry value. An immediate entry, usually comprising more than one individual keypad entry, appears on line 44-1 and couples with a decisor function 46 (e.g., a function capable of making a logical decision) which recognizes a presence of the entry. The keypad entry referred to in this arrangement are ordinarily directed to "channel selection" in a controlled device. In any event, in the presence of an entry sequence a "yes" signal appears on line 50-1, otherwise a "no" signal appears on line 48 which feeds back to the keypad 40. The signal on line 50-1 is again looked at by the decision function 52 and if two digits comprise the entry signal on line 50-1, a "yes" signal results on line 60.

In event the entry signal on line 50-1 is a singular digit, a "no" signal on line 54 initiates the "add Ø prefix" function 56 serves to prefix the incoming single digit on line 50-1 with a "0" resulting in a "two digit" combination which satisfies the logic of the decisor function 52 providing a "yes" signal on the line 60.

The keypad entries 40 may be prefixed by a device selection entry, delivering a signal on line 44-2. Device entries are normally filtered from acting on the decisor 46, but rather routed to a device selection function 62. Most particularly, if the device selections include TV and CBL (for the televisor and cable box), the device selection function 62 recognizes and determines which mode is presently functional relative with subsequential keypad entries 40.

When a televisor and a cable box are used together, linked together by an intermediate video signal usually set on channel 3 or channel 4, it is the cable box into which "channel changes" are desirously entered by a televisor viewer. Meanwhile, the televisor is maintained set to the intermediate video signal channel. For purpose of this depiction, "device-1" is the cable box.

Following this typical condition, the device selection function 62 ordinarily delivers a signal on line 64-1 which enables the "device-1 encoder" 66. The device-1 encoder includes two inputs as shown. Line 50-2 supports functional changes, such as fine tuning, volume up/down (if available through the cable box), power on/off and so forth. Similarly, the line 60 describes the channel changes, such as promoting a change from channel 47 to channel 23, for example. It is the purpose of the device encoder to create a specific cryptic code pattern on line 68 which is unique to the cable box, including the specific make and model of the cable box. Usually this information is provided by the remote controller maker and for purpose of my invention, is held in a local ROM or RAM (memory, not shown), in accord with well known practice. The specific device encoded (e.g., "device-1 encoded") command signal on line 68 is nextly utilized by the "wireless signal sender" 74 which essentially develops a carrier signal (often about 38-kilohertz), modulates the carrier signal with the command signal delivered on line 68, and subsequently drives a wireless signal producing device, such as an infrared light emitting diode or the like. The result is a "wireless signal command" 76 delivered to a distal remotely controlled device, such as the cable box or televisor.

The utter essence of this invention is to assure the viewer (user) utilizing a televisor in combination with another device such as the cable box or VCR-machine, that the intercoupling intermediate video signal is set properly. This mostly means that the televisor's input tuning is maintained on the necessitous channel. The cable box or VCR-machine output is usually semi-fixed, predetermined typically by a slide switch on the device's rear panel to deliver the interlink signal on one of channel 3 or 4 in most cases.

To embody this desirable improvement in a remote controller conforming with my invention's teachings may include a separate or at least distinctly operable "link key button" 80. When this button 80 is pressed by the user, a signal delivers on line 82-1 which is recognized by the "link send" decisor 84, delivering a yes signal on line 88-1. In absence of the button 80 entry, the decisor 84 alternatively delivers a no signal on line 86 which in effect loops through the link key button 80 to repeatedly "scan" the button for activity. This is a well known practice in keypad and keyboard design.

If a key activation is acknowledged by the link send decisor 84 by presence of the yes signal on line 88-1, the "link value 3 or 4" function is enabled. In effect this establishes an output on line 96 of a "channel 3" or "channel 4" selection as a virtual channel change command, with the value being determined by the "preset link value 3 or 4" function 92, which may be embodied as the earlier mentioned rear panel switch. As a result, the signal on line 96 may be simply a data value representing a "3" or a "4", coupling therefrom with the input of the "two digits?" decisor 52. As a result the singular value "3" or "4" is automatically prefixed with a leading 0 as needed for effecting the channel change in the remotely controlled televisor, or other device.

Note further that the link keybutton activation signal on line 82-1 further couples 82-2 with an input of the "device selection" function 62, which in this case delivers a signal on line 64-2 to enable the "device-2 encoder" 70 which is preset to relate to the remotely controlled televisor. The result is an encoded command signal on line 72, for example a channel change command 0"3", which is sent via the wireless signal sender 74 to the distal remotely controlled televisor.

Looking back on FIG. 2, it becomes quite clear that a user may utilize the keypad 40 to select either of the controlled devices (device 1 or device 2) and submit channel change and other commands to one or the other of the selected devices. Furthermore, it is most notably clear that the link key button 80 may be engaged by the user to deliver an absolute channel selection signal submission to the remotely controlled televisor, to assure its tuning being affirmed as set on channel 3 or (channel 4) as needed for effectual interlink coupling of the intermediate video signal to be established between the cable box and the televisor, for example.

Figure 3:
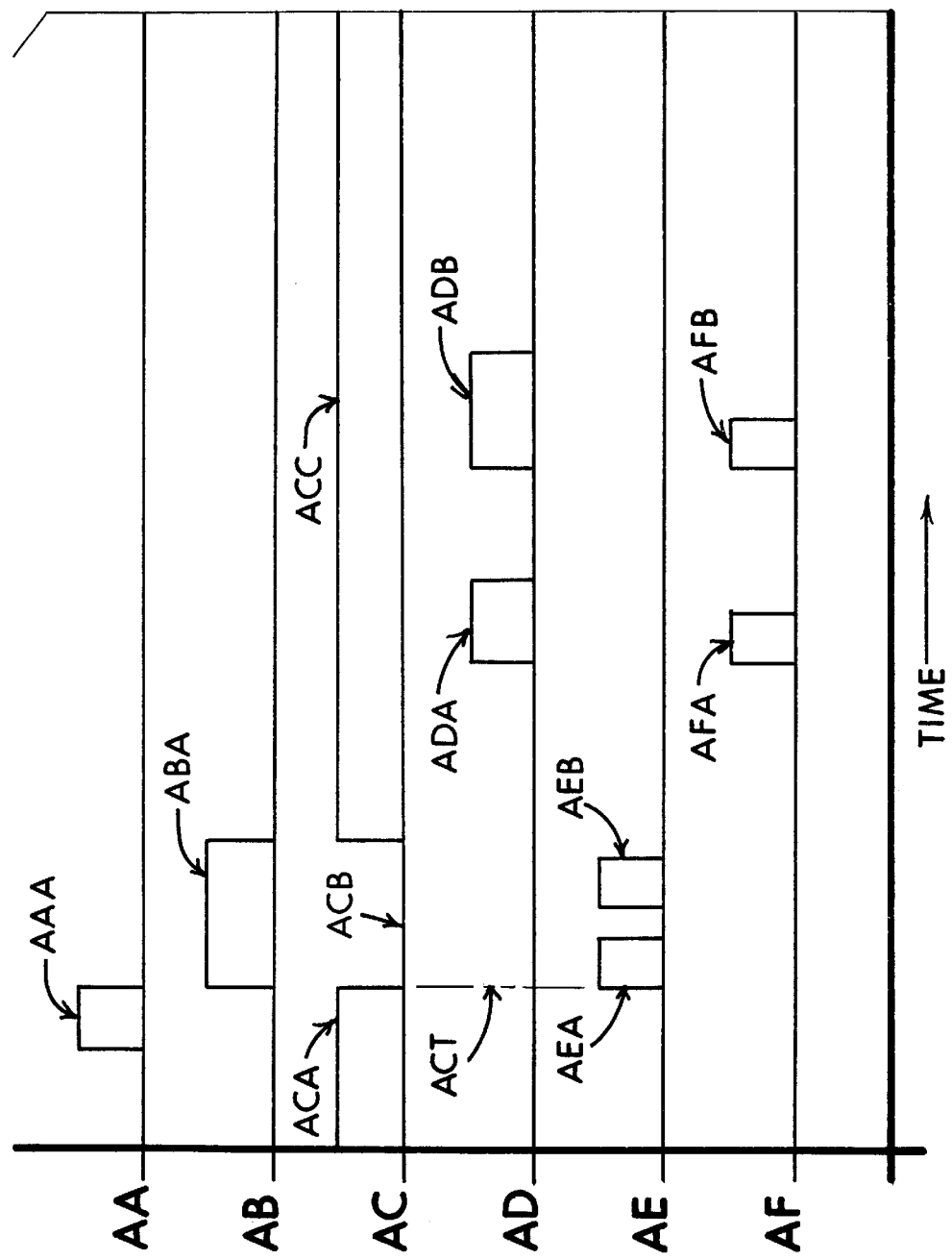
FIG. 3—Timing diagram for sequence of events which may be associated with the elements of FIG. 1.

A graphical showing of the events typically representing my invention's deployment are shown in FIG. 3. A pressing of the LINK keybutton by a user is depicted on line AA as signal event AAA. Several events result with the LINK keybutton activation. Firstly, a link signal event shown on line AB as signal ABA defines a link command window during which time the preceding device selection ACA on line AC is changed to the link subject device (e.g., usually the televisor) during the period ACB, whereafter it is returned to the previous device selection ACC.

During a occurrence of the link event signal ABA, two necessitous channel selection command signals are sent, usually to the televisor. The pattern on line AE depicts as an interlink channel digit and usually a "3" or a "4" being sent AEB, preceded by a "0" precursor AEA.

Additionally this FIG. 3 shows the viewer's optional entry of a channel selection keypad activity on line AD typified by, let's say, a digit "2" ADA preceded (in time) by a digit "7" ADB. The result is a sending of a "2" AFA preceded by a "7" AFB on line AF which represents the wireless signal sent to, for example, the cable box as determined by the selection state of signal ACC.

Figure 4:
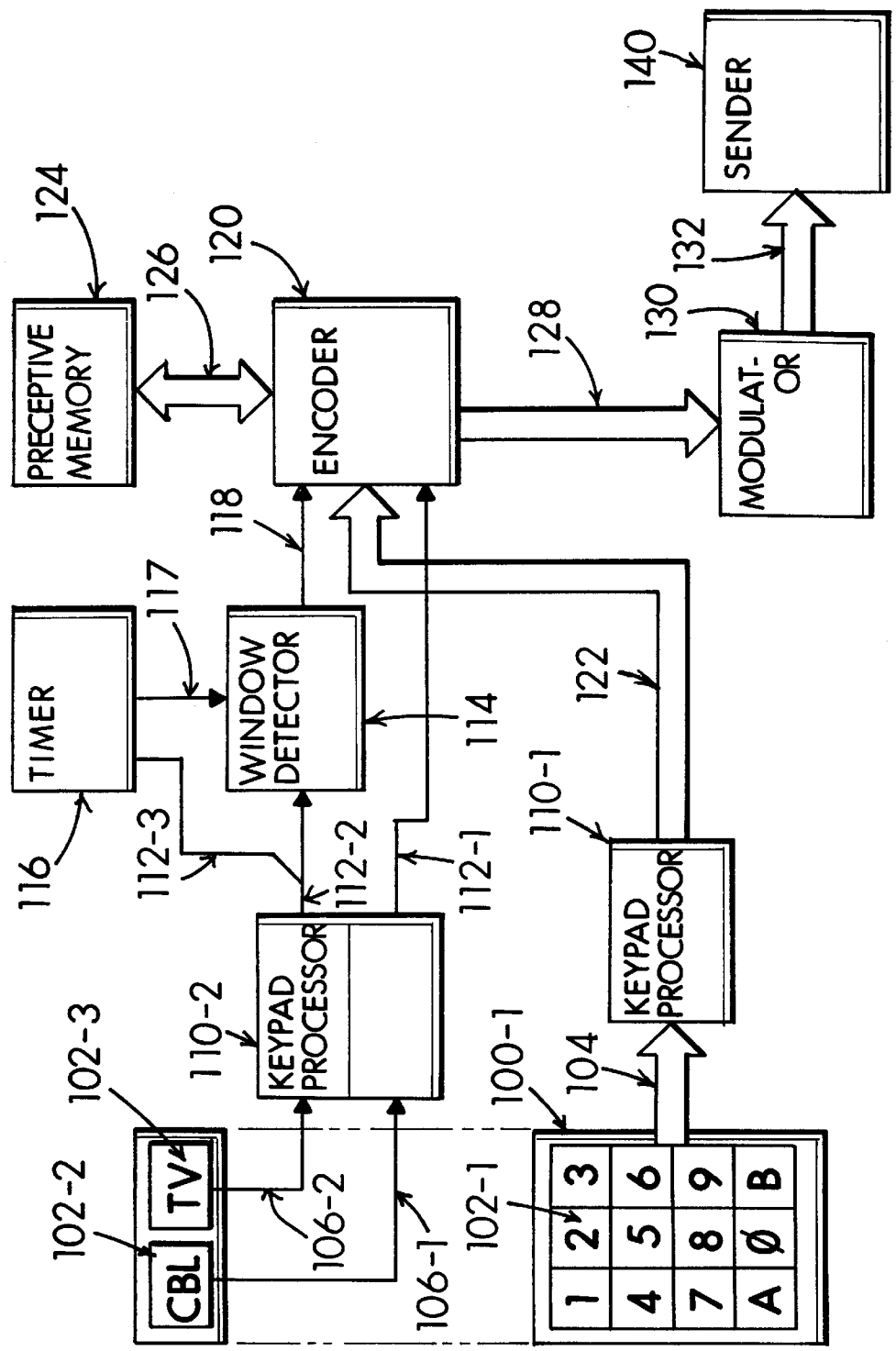
FIG. 4—An embodiment for the remote controller where maintaining the TV device select button beyond a predetermined time interval urges sending of an interlink setup command derived from a preceptive memory.

Looking now at FIG. 4 one finds a keypad 100-1 including at least ten keybutton entry selections. This may be called the user's keypad port, for submitting numerical and other data into the remote controller. Additionally, a keypad extension 100-2 includes a cable selection CBL keybutton 102-2 and televisor selection TV keybutton 102-3.

When a user intentionally urges one of the keybuttons 102-1 to accept an entry, a signal corresponding to the keypress selection submits a data bearing signal 104 to the input of a keypad processor 110-1.

Similarly, by pressing one of the device selection keybuttons 102-2, 102-3 a corresponding signal is developed on line 106-1 or 106-2 which arrives at the input of a keypad processor 110-2. For example, urging an entry through the keybutton 102-2 port establishes a signal on line 106-1 which is conditioned by the keypad processor into a selection signal on line 112-1 that couples with an input of an encoder 120. The result of this sequence is to enable the encoder to select and read data from the preceptive memory 124 via data and address lines 126 which set the encoder data processing logic specifically to deliver an encoded signal on line 128 which is translated by a modulator's 130 coupling 132 with a sender 140 to develop a uniquely encoded wireless signal ordinarily maintained for exclusive recognition by a remotely controlled cable box.

My invention's essence is more precisely expressed through the pressing of the televisor selection keybutton 102-3, resulting in a signal on line 106-2 which is conditioned through the keypad processor 110-2 delivering a televisor selection command signal on line 112-2. A window detector 114 intervenes this signal line, whereby the window detector is coupled with a timer 116. The timer commences a predetermined timing interval upon initial activation of the keybutton 102-3 as recognized by the onset of the selection command signal on line 112-3 as extended from line 112-2. The timer signal on line 117 defines at least two states for the window detector 114. During the initial state and if the keybutton 102-3 is released before the timer 116 " timesout", the selection signal on line 119 merely "selects" the televisor as the object of command response for entries manually injected through the keypad port 102-1 keybutton activity by the user. In other words, the encoded signal delivered from the encoder 120 and ultimately extended as a wireless signal by the sender 140 serves to merely allow manual channel selection or other changes to the remotely controlled televisor, as submitted by the various keybutton 102-1 entries by the user.

On the other hand, if the televisor TV keybutton 102-3 is maintained in an operated state beyond the timeout period determined by the interval timer 116, the signal state on line 117 changes to deliver a modified or alternative signal on line 118. The data borne by this alternative signal on line 118 establishes the encoder 120 to retrieve predetermined channel selection values from the preceptive memory 124 and submit them via line 128 to the wireless sender 140 to instruct the televisor to tune to a preset channel and usually one of channel 3 or channel 4 as necessary to obtain the interlink coupling between the cable box output and the televisor input.

Recognize that under the teaching of my invention, it is the maintained state of a user's pressing the TV keybutton 102-3 that the intermediate video channel selection setup signal is sent to the televisor to affirm or reaffirm its immediate and absolute setup on the necessitous interlink signal channel. In this mode, I say that the TV selection keybutton 102-3 becomes a virtual dedicated keybutton useful for re-establishing the interlink setup conditions without a need for fumbling with the keypad 102-1.

Figure 5:
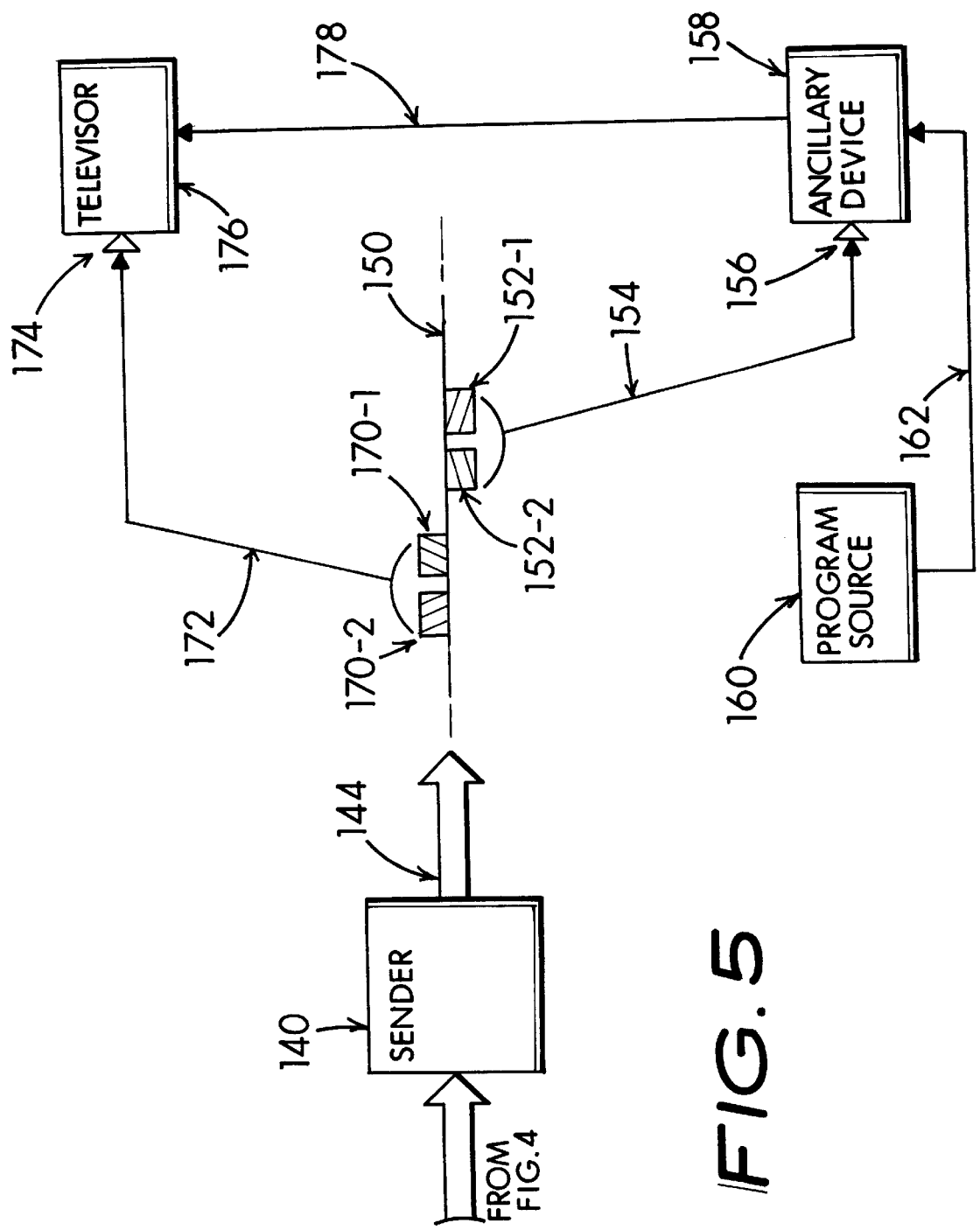
FIG. 5—An extension of FIG. 4 showing a sending of command signals to a televisor and an ancillary device.

In FIG. 5 I offer extension of the preceding teaching of FIG. 4, to include the sender 140 receiving the modulator signal on line 132 and to deliver 144 a wireless signal 150. Observe that the wireless signal 150 may include at least two command signals. One set of command signals is linked 154 with a wireless receptor 156 input of an ancillary device and most likely the mentioned cable box. As a result, to select channel "27" for example, the wireless signal is modulated with a "2" signal 152-1 followed by a "7" signal 152-2. This wireless sequence determines the input of the cable box to be set to channel "27", resulting in the program source 160 coupling channel 27 program signals over line 162 which are received by the cable box 158. The cable box output is preset to an intermediate video signal channel, for example channel "3" intercoupled 178 with the televisor 176 input.

When the TV selection button 102-3 of FIG. 4 is maintained as activated for a sufficiently long period of time to produce the interlink setup command signal, the channel selection digit values "∅" 170-1 followed by a "3" 170-2 are delivered 172 in a recognizable sequence to the remote control receptor port 174 of the televisor, thereby setting or resetting the televisor input to channel 3 to assure tuning compatibility with the channel 3 interlink signal delivered by the cable box on the interlink line 178.

Figure 6:
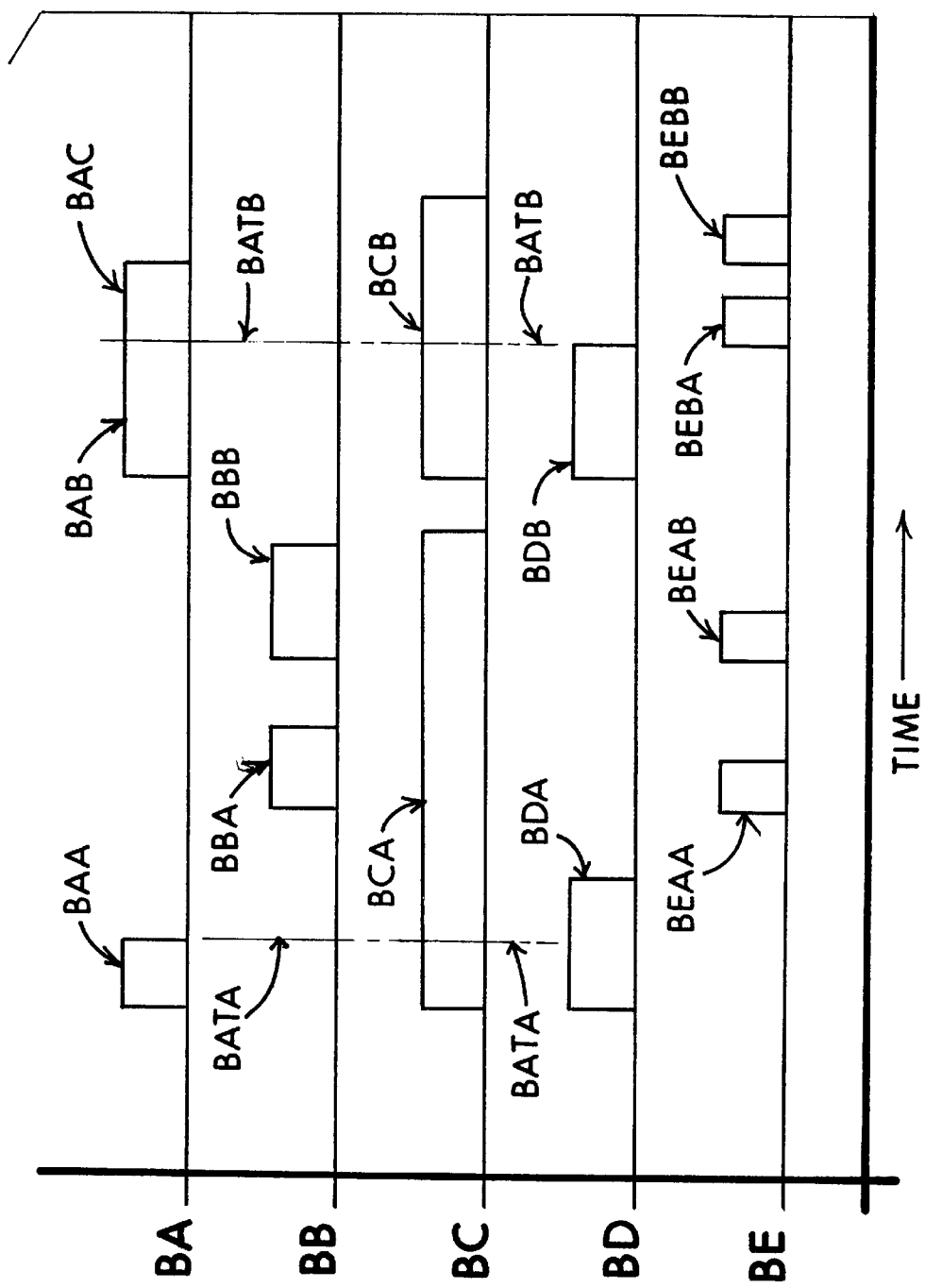
FIG. 6—A showing of maintain the key entry BAB, BAC beyond a timing period BATB determined by a timed interval BDB encourages the delivery of interlink setup commands BEBA,BEBB to initialize a televisor or other device's input setting.

With FIG. 6 the general operation of the configuration depicted in FIG. 4 is shown relative with timing of various event signals. The device select TV keybutton is shown on line BA as signals BAA and BAB, whereby the keypress BAB is maintained for an additional duration BAC.

When the keybutton BAA is pressed, the televisor is selected BCA and a timer 116 is initiated for a fixed period BDA. Recognize that the keypress BAA is maintained for a shorter period of time than the timing period BDA, as depicted by the extended broken line BATA reaching between BAA and BDA.

Once the televisor device selection BCA is obtained, additional keypad entries BBA, BBB may be submitted by the user which are encoded as command signals BEAA, BEAB translated to the televisor or some other apparatus allowing the user to manually determine channel selection or other operational functions.

When the device entry keybutton BAB is maintained through the period expressed by BAC it is shown that the maintained time period depicted by the extended broken line BATB exceeds the duration of the timer interval BDB. Observe further that the time periods BDA and BDB are substantially similar in duration and that the period BDA commences with the initiation of the keypad entry BAA whilst the time period commences with the initiation of the longer-maintained keypad entry BAB-BAC. As a result of exceeding the time duration of time interval BDB as defined by the broken line RATB, the necessitous channel command signal is sent to the televisor and includes a "3" BEBB preceded by a "∅" BEBA.

Figure 7:
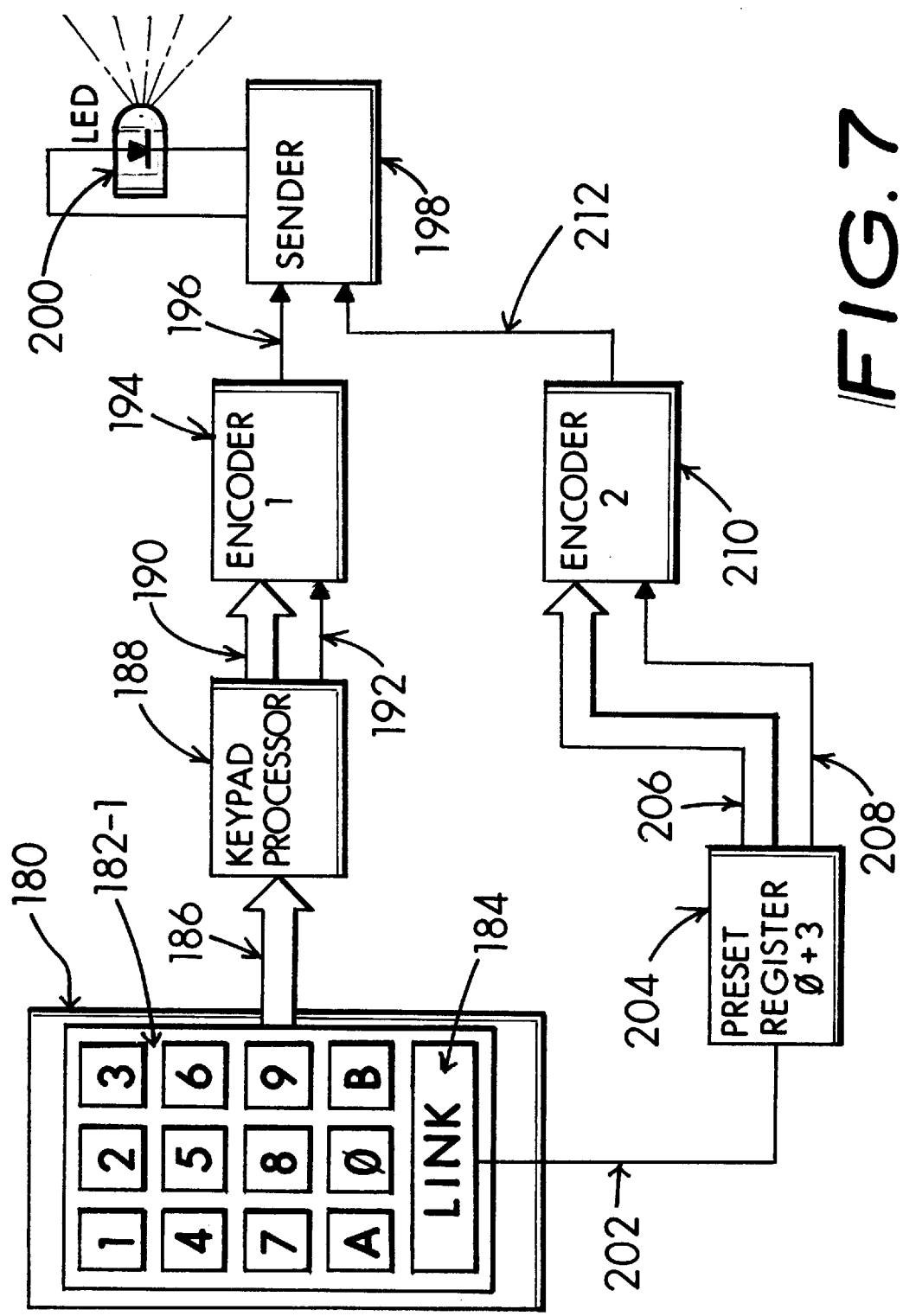
FIG. 7—A remote controller including a distinctive LINK keybutton utilized for sending an interlink setup command held in a register.

Looking further to FIG. 7 one finds a keypad 180 including a set of keybuttons 182-1 configured as individual entry ports for submitting the user's preference of channel selection or other functions into the remote controller for subsequent translation to a remotely controlled device, such as a televisor, cable box, VCR-machine and satellite receiver. Pressing a selection of keybuttons 182-1 delivers a keybutton weight data signal 186 to a keypad processor 188. In the context of this invention, the weight of a signal means the essence of the signals value. For example, a digit value of "2" entered by a keybutton will have a distinctly different binary value or analog magnitude than a digit value of, say "5". The term weight is used to differentiate between the value representations as a virtual value having meaning to the processing circuitry comprising the remote controller and the remotely controlled device.

In any event, the keypress entry submitted to the keypad processor 188 delivers a corresponding signal on the data bus 190 to an input of an encoder-1 194, which is further enabled by a signal on 192 indicative of a fresh keybutton entry. The encoder-1 delivers a signal on line 196 representing the keybutton entered values. The result is the signal on line 196 is impressed on the sender, which develops a wireless driver signal at its output which excites a wireless sending element 200 and includes a compound encoding signature uniquely recognizable by a single one of usually several associated remotely controlled devices located in operational proximity of one another.

In the application where a cable box receives incoming program content and delivers that content as a converted signal usually appearing on one of channel 3 or channel 4, subsequently coupled with the input of the televisor it becomes essential that the televisor be compatibly tuned to the same channel as delivered from the cable box. To achieve this essential compatibility requires that the viewer tune and occasionally retune the televisor to the intermediate video signal channel 3 or channel 4.

In FIG. 7 I show a separate LINK keybutton 184 which may be pressed by the user, delivering a signal on line 202 to a preset register 204. The preset register (perhaps a pre-weighted serial shift register) or memory is pre-loaded with data equivalent to pressing the number keybuttons ∅ and 3, or else ∅ and 4 in rapid-fire sequence. The resulting channel selection digit values appear on the data bus line 206 coupled with an encoder-2 210. The encoder-2 may be differently encoded than the encoder-1 194, being preset so that the encoding algorithm encoder 210 is suitable for recognition by the televisor, while the encoding algorithm of encoder 194 may be attuned to a different ancillary device, such as the cable box or the VCR-machine elsewhere mentioned. In any event, the encoder 210 activated by an enablement signal routed on line 208 submits the fixed channel selection sequence (perhaps 03) to an input of the sender 198 for developing wireless excitation and translation of the command signal to the remotely controlled televisor.

Figure 8:
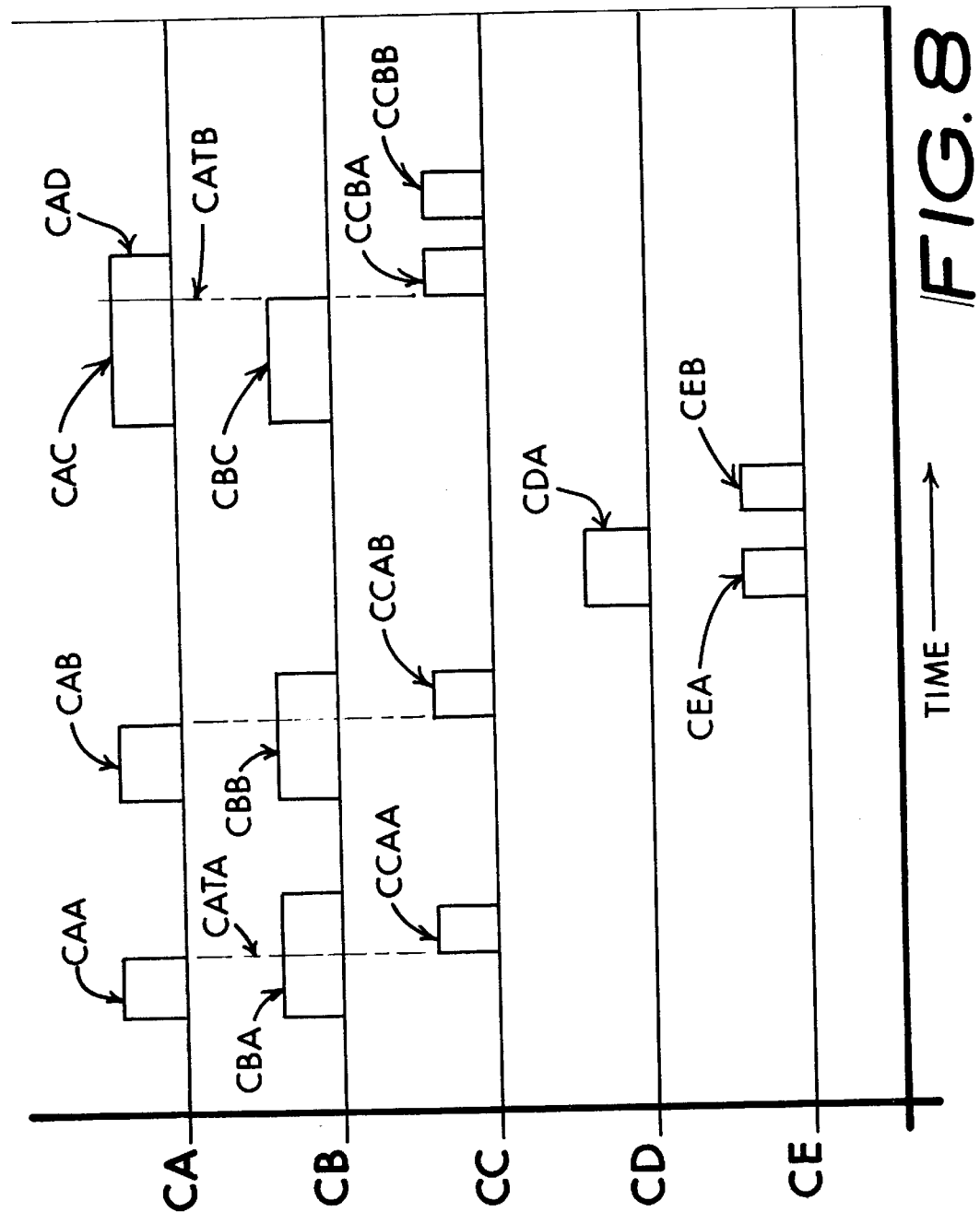
FIG. 8—A timing diagram showing where entering a single keypress CAC and maintaining it for a period CAD in excess of a timer established interval CBC urges a sending of a two digit channel selection command CCBA,CCBB where the prefix value CCBA is a 0.

With FIG. 8 I further show operation of my invention where succession of two keypress entries CAA, CAB depicting the channel selection values: CAA=7, CAB=2 are submitted as shown on line CA. Coincidental with each keybutton action CAA, CAB a corresponding timer measured interval CBA,CBB shown on line CB is started. Note that the keybutton closures CAA,CAB are briefer than the time intervals CBA, CBB which are typically on the order of one to ten seconds duration, more or less. As a matter of fact, I have found about 1,500 milliseconds quite acceptable. Upon release of the keybutton actions CAA, CAB a channel selection signal is sent on line CC as command signals CCAA, CCAB where: CCAA=2 and CCAB=7, resulting in a channel 27 selection.

Since the importance of maintaining the televisor tuned to the same channel as the intermediate video signal delivered from the output of the cable box or VCR-machine is well known, I show the inclusion of a LINK keybutton action CDA on line CD. When the LINK keybutton is enabled CDA, a succession of channel change command digits CEA, CEB are sent to the televisor, where: CEA=∅ and CEB=3 resulting in a sending of ∅3 and an affirming the televisor tuner setting to channel 3.

Often a viewer may want to set the cable box to a "single digit" channel to receive programs of various sorts. This includes any channel between 2 and 9. Ordinarily, to send such channel changes, the remote controller needs to have the value ∅ prefixed to the single digit channel. Hence, channel 5=∅5, channel 7=∅7 and so forth. Aside from being a nuisance to do, it is not unusual for a viewer to simply forget. As a result of realizing this annoyance, my invention includes a provision depicted in FIG. 8 where pressing the single digit keybutton (such as keybutton "8") CAC and holding it down CAC+CAD for an interval of time in excess of the time period CBC measured by the timer results in an automatically inserted leading ∅ prefixing the selected prime entry value 8 CAC, resulting in the channel selection value ∅CCBA preceded by a leading 3 CCBB on line CC. In effect, the singular prime digit channel selection entry becomes self-completing by merely holding the single digit keybutton down for a moment or so (typically about 1½ seconds or more). This becomes much easier to accomplish (and remember to do) than the heretofore necessitous pressing of the ∅ keybutton before entering the prime digit, such as 8.

Figure 9:
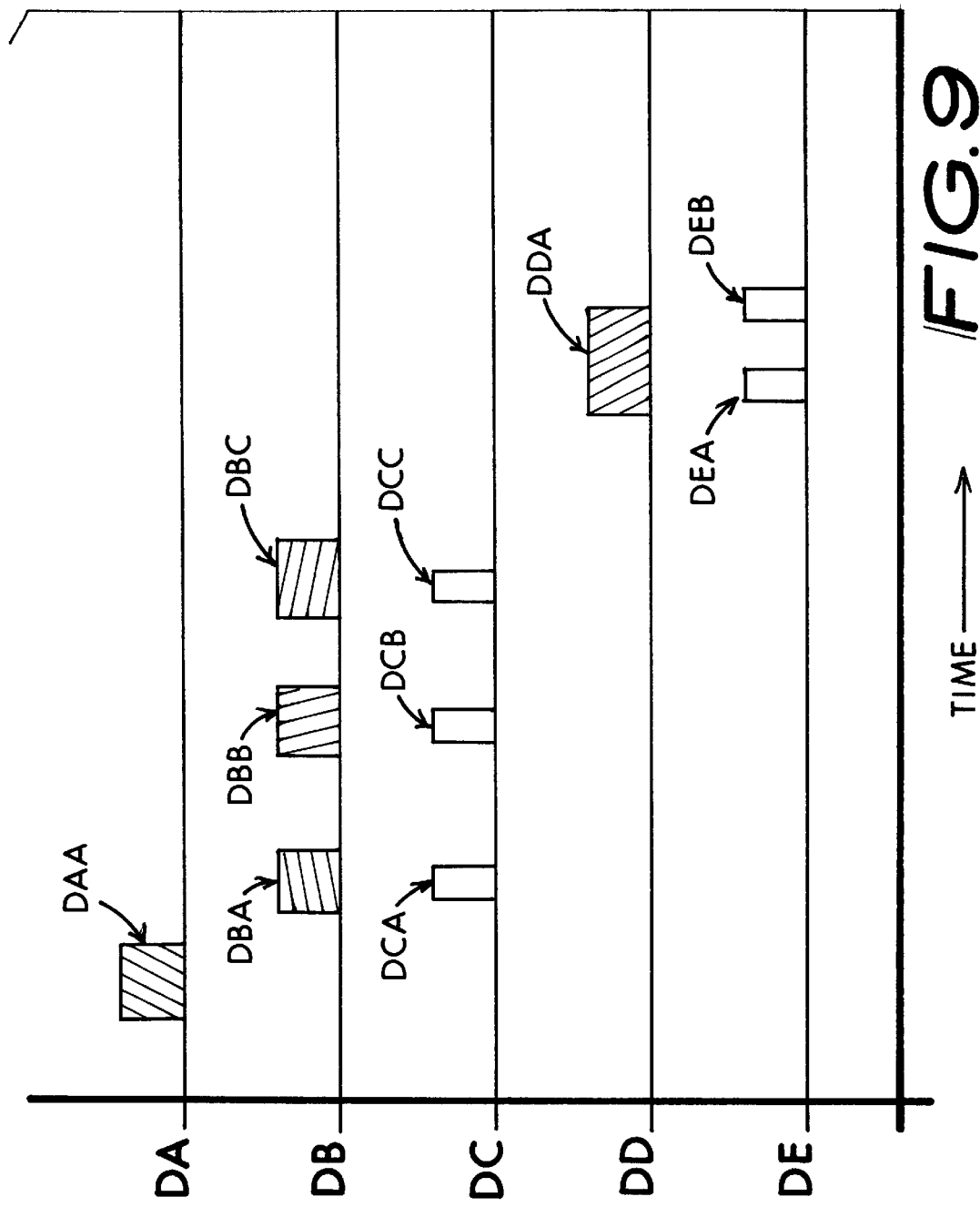
FIG. 9—A timing diagram showing an entry of a device selection DAA followed by several keybutton actions DBA, DBB,DBC each sending a correspondent command DCA, DCB,DCC to a remotely controlled device and further where pressing a LINK keybutton encourages the sending of a two digit combination such as 03 to setup a televisor, etc.

With FIG. 9 I show a selection of a cable box CBL on line DA as signal DAA. This makes selection of the cable box as the object for control by the remote controller. Realize now that what I call the cable box selection on line DA could just as well be any other device, a VCR-machine, a DVR-machine, a DVD-player, a satellite receiver or whatever. The invention's essence remains the same. As I further show, several key entries are submitted on line DB. I first show a POWER ON/OFF function command DBA (realizing that in most remotely controlled devices, power is a toggle function. One click ON, one click OFF). I further show two channel selection digit prime number entries DBB, DBC such as DBB=2 and DBC=7 representing channel 27.

In measured response to each of these keybutton entries, a resulting encoded wireless signal is delivered as shown on line DC. The representations DCA-DCB-DCC correspond with the keypad sequence PWR and 2 and 7 as entry submissions to the presently selected remotely controlled device (e.g., cable box, etc.).

I also depict in FIG. 9 the actuation of a LINK keybutton, similar to the LINK keybutton of earlier FIG. 1 or FIG. 7, which delivers a signal DDA on line DD. This action introduces a succession of two encoded signals DEA, DEB specifically sent to the televisor. Ordinarily, the link signal includes a prime digit 3 or 4 DEB preceded by a leading ∅ DEA.

Figure 10:
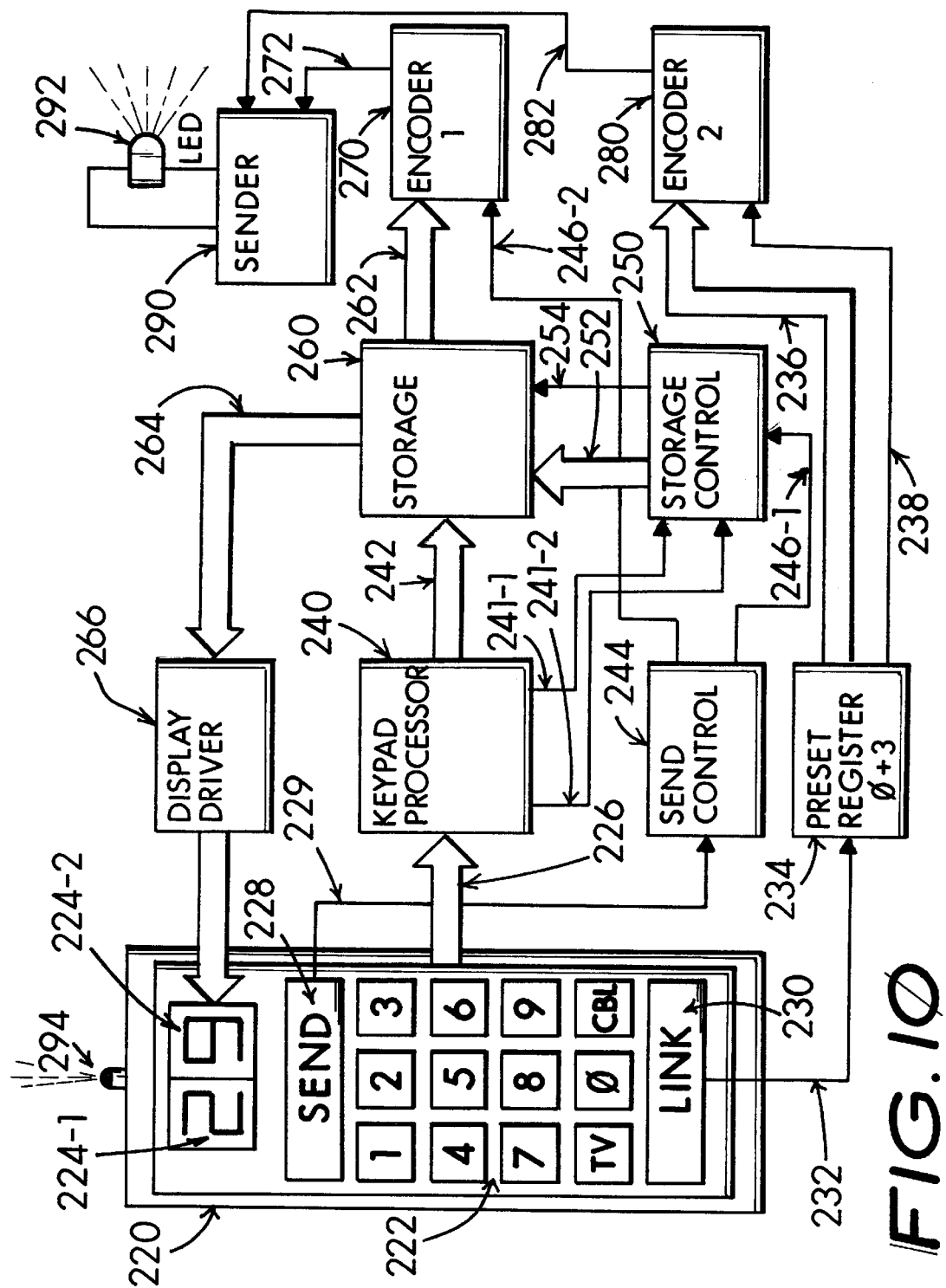
FIG. 10—Overview of a remote controller adapted to include a LINK keybutton for sending an affirmative setup signal, a keypad for entering user selections and temporarily storing them until a SEND keybutton is operated, together with a display showing the keypad entries submitted by the user.

Advancing to FIG. 10 I represent a handheld remote controller 220 to include a multi-key entry keypad 222 by which a user (viewer) may inject entries introduced by finger actuation. I also depict the remote controller to include, or at least optionally include, a "digital display" 224 which shows the numerical entries made by the user. I further show the remote controller to include a SEND keybutton and a LINK keybutton, each of which will be functionally discussed.

An essential function of my invention is to "normalize" the interlink coupling between a televisor and an ancillary device, such as the oft-mentioned cable box or VCR-machine. In this FIG. 10 I show a LINK keybutton 230 which may couple 232 with a preset register 234. By definition, the preset register is in fact "preset" by design, by download or by other means to provide the channel selection data necessary to set the televisor tuner to the necessary channel tuning selection, and usually one of channel 3 or channel 4, to attain the interlink coupling compatibility. As a result, the LINK keybutton action encourages the preset register 234 to deliver a predetermined channel selection data signal over the data bus 236 to an input of an encoder-2 280. The LINK keypress induced signal also urges an ENable signal on line 238 to the encoder-2 280. The result of this preceding activity is to send a channel selection command, such as ∅3 or ∅4 to the remotely controlled televisor. This command is configured through the encoder-2 280 and submitted to the sender 290 for excitation of a wireless coupling device (e.g., an infrared light emitting diode, etc.) 292 affixed to the head-end of the remote controller 294.

As shown, the keypad 222 delivers signals over a keypad bus 226 to a keypad processor 240. As is well known practice, the keypad may be scanned by the keypad processor and if scanning is utilized, the data riding on the data bus 226 represents the scanning signal data uniquely representing keypad activity.

STORE AND SEND MODE

I borrow from my earlier U.S. Pat. No. 6,094,239 to advise the advantageous operation afforded by including a capacity for storing up a sequence of two or three "channel number digits", such as "4" and "9" in a register, whereafter the register is dumped to deliver the stored digits as a rapid fire succession of "4" and "9" in one command signal burst sequence so as to convey the command which tunes the remotely controlled device to channel "49". This "store and send" mode is included in this teaching merely to express its advantage as an adjunct to the present teaching's fundamental objectives found in the intentionally expressive sending of a set-up or affirming command signal to a specific device such as a televisor to assure interlink compatibility between two or more interlinked devices used in conjunction with one another.

The keypad processor delivers key-entry selected data on bus 242 to the input (data input or write input) of a storage device 260. This is the "store" mode. In its simplest form, the storage device 260 may be embodied as a FIFO shift register, or as an addressable RAM (memory) device. Such a memory arrangement is sometimes called a scratchpad memory, due to it's use as a temporary storage medium. As shown the keypad processor also includes an UP and a DOWN output 241-1,241-2 that couples with the storage control function 250. The UP and DOWN signals control the storage of the keypad processor output data in the storage device 260. The important consideration is that the key-entry selected data is temporarily stored with sufficient space to accommodate several bytes or words of data.

The storage device 260 may also include a data output line 264 which provides display data to a display driver 266. The display driver's output bus 268 couples with the digital display 224, whereupon it shows the values entered by the user's keypad 222 activity. As a result, the key entries may be reviewed for accuracy.

Upon the completion of an entry sequence for, for example, a channel selection, the user may orientate the remote controller for effective wireless coupling with the remotely controlled device, whereupon the SEND keybutton 228 may be pressed. This is the "send" mode.

The SEND keybutton 228 action submits a signal 229 to an input of a send control function 244. The send control 244 delivers an output 246-1 to the storage control function 250 which urges it to address and read the temporarily stored user submitted channel selection from the storage memory 260. Realize that the storage 260 may include any manner of memory or shift register schemes providing temporal "scratchpad" storage and selected as a matter of conventional engineering design preference or choice, with equivalent end results. Minor adjustments to the hookup of the elements shall have no bearing whatsoever upon the novelty of this invention's offering.

In effect pressing the SEND keybutton initiates an immediate uninterrupted sending of a sequence of commands representing the setting or resetting the selected device, for example the cable box, to the user's choice of channels. The read-out, stored data digits are ordinarily ushered over the data line 262 coupled with an encoder-1 270 and thence coupled 272 to the sender 290 for transmission 292 to the selected device. In other words, if the user pressed the keys CBL, 5 and 9 the command sequence would select the cable box and send a channel selection command of 59 in a rapid fire succession.

Figure 11:
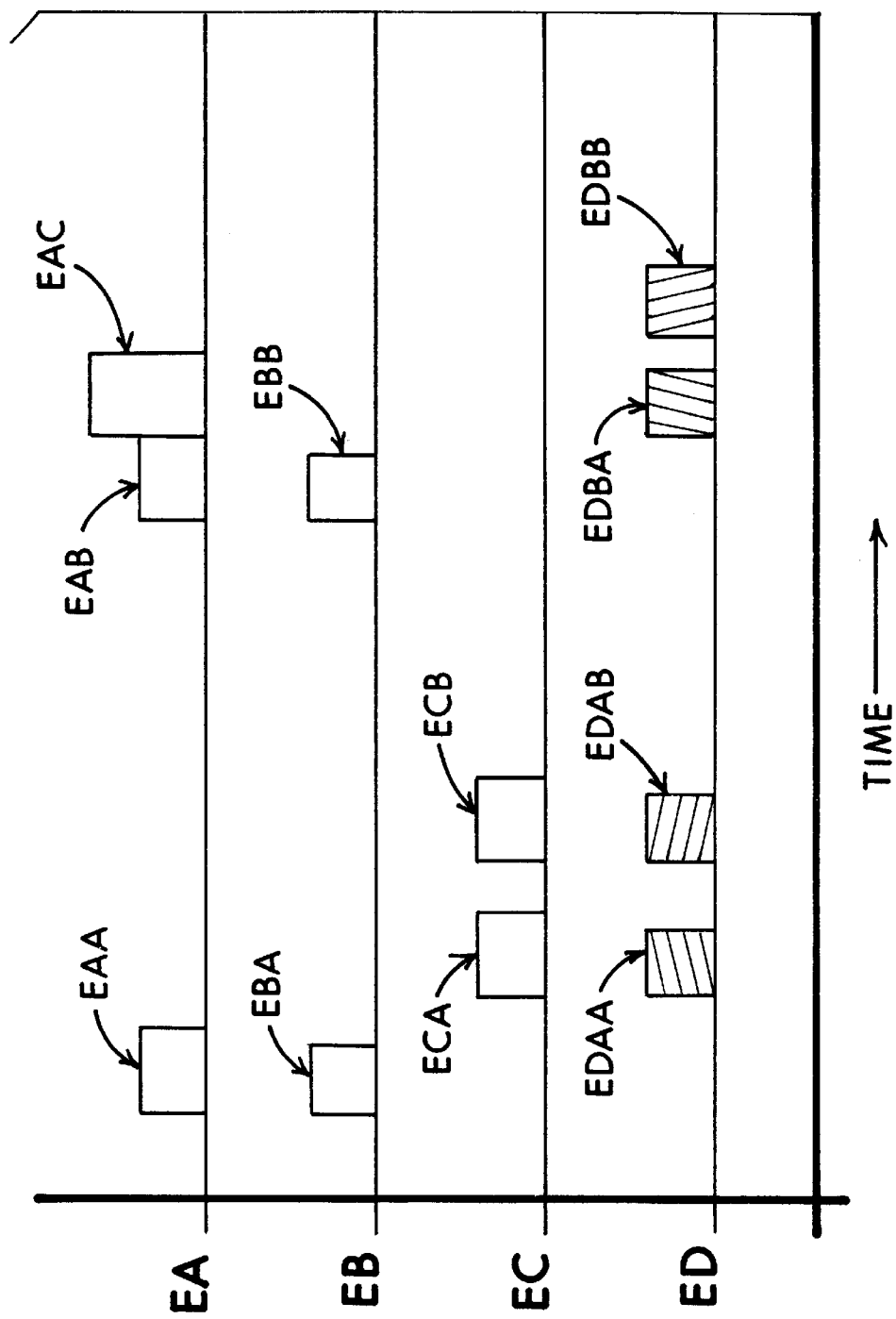
FIG. 11—A timing diagram showing a device selection entry key EAA to include two levels of activation EAB,EAC which may introduce the sending of an affirmative setup command.

Moving on to FIG. 11, I show a device selection keypress EAA on line EA. For example, this might be the cable box selection CBL key as depicted earlier in FIG. 1 or a VCR-machine selection key, etc. The action results in the device selection signal ERA for the cable box on line EB, whereafter the user may submit keypad entries ECA, ECB on line EC for his/her program channel preference. For example, if channel 46 is desired, the entry ECA=4 while the entry ECB=6. The result is a wireless signal encoded for recognition by the cable box on line ED where EDAA-4 and EDAB=6.

When the cable box device selection key CBL is pressed EAB and further pressed beyond a yield point EAC, the CBL device selection signal EBB is obtained, but more importantly, a channel setup command is initiated. What this means is that, referring to line ED, two channel selection commands are directed to the televisor to affirm that it is in fact set on the necessitous channel selection and usually 3 or 4. This results when the wireless components EDBA=0 and EDBB=3 (or EDBB=4), with their encoding set to match the remotely controlled televisor's decoding requirements.

What I say by FIG. 11 is that a key may be equipped with a normal actuation level and an extended actuation mode (e.g., a normal-press and a hard-press). The normal actuation mode suffices to enable the key's function as normally intended for channel selection, device selection or whatever other function may be sought. On the other hand, extended actuation or pressing beyond a point where considerable resistance is met for the normal actuation level, delivers a signaling command which acts like a virtual SEND command entry by the user and reaffirms the setting of the televisor (or other designated device) to a necessitous state, such as the mentioned specific channel tuning setup.

Figure 12:
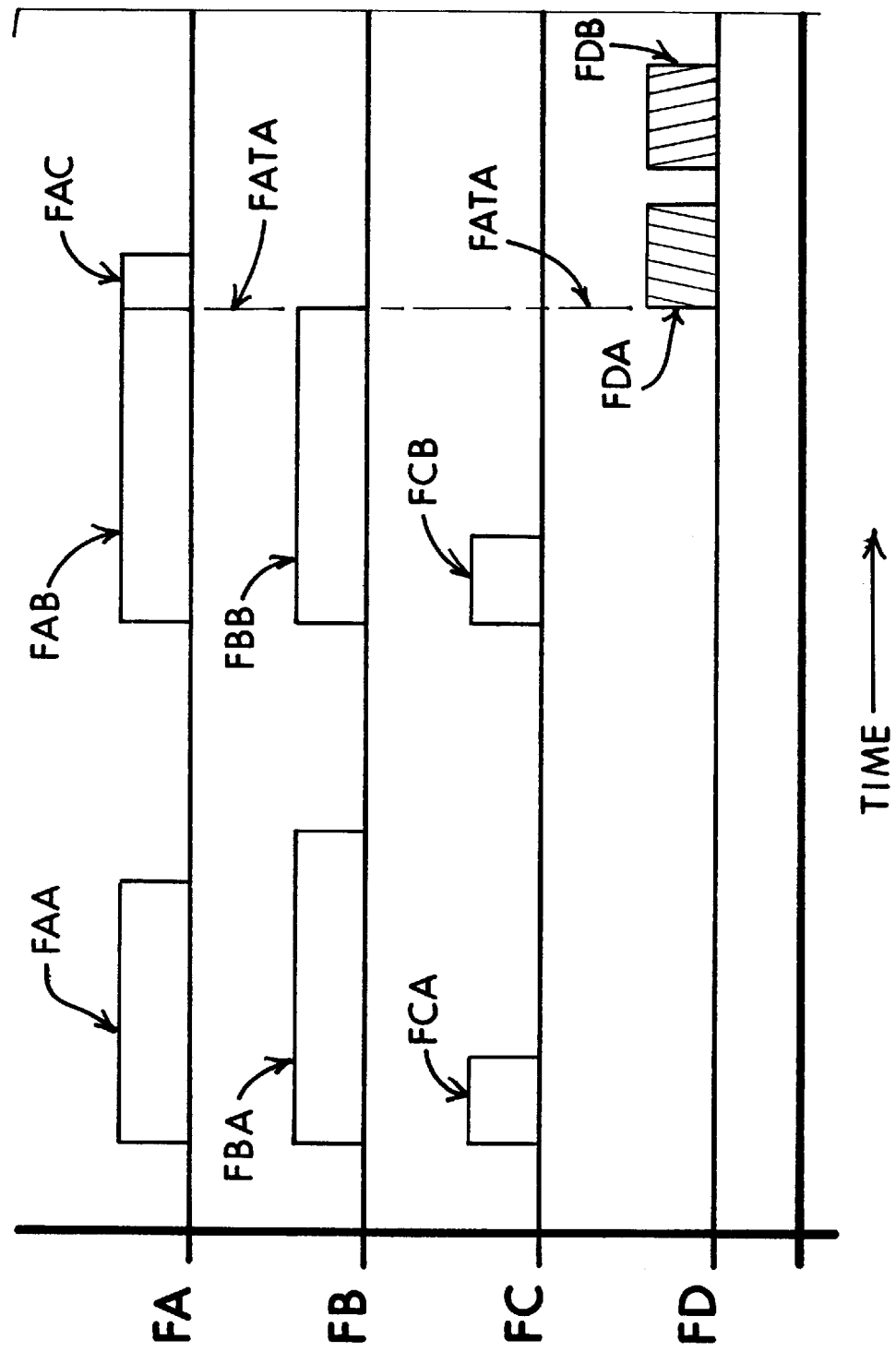
FIG. 12—A timing diagram showing the use of a device selection key FAB to initiate sending of setup command signals FDA,FDB when the key is maintained FAC for a period of time FBB exceeding FATA that determined by a timer.

With FIG. 12 my invention is shown to include a televisor TV select keybutton FAA or cable box CBL select keybutton FAB entry on line FA. You will find that on line FB I show a timer controlled time interval FBA which commences with the actuation of the keybutton associated with signal state FAA, and an interval FBB commencing coincident with the selection state FAB. The result of pressing FAA is to deliver a device select signal FCA on line FC which sets the encoding mode of the associated remote controller, essentially to be compatible with the selected device's decoder. Understand that the device selection states FAA, FAB as now described may also associate with various ancillary devices, as well as the televisor. This determination is merely an application specific engineering decision.

When the device selection key associated with signal FAB is maintained beyond the time interval FBB, the keypress is recognized as an intentionally submitted virtual SEND command to send the televisor (or other predesignated device) an interlink channel setup command. In other words, when the keypress signal FAB exceeds FAC the timer signal FBB duration, not only is a device selection signal FCB produced, which selects whatever devices is determined by the keybutton associated with signal FAB, but also a signal is developed which temporarily overrides the selection. This virtual SEND command signal sequence is ordinarily directed to the televisor as encoded channel selection signals FDA=0 and FDB=3 resulting in the televisor (or whatever) being affirmed as set on channel 3.

Figure 13:
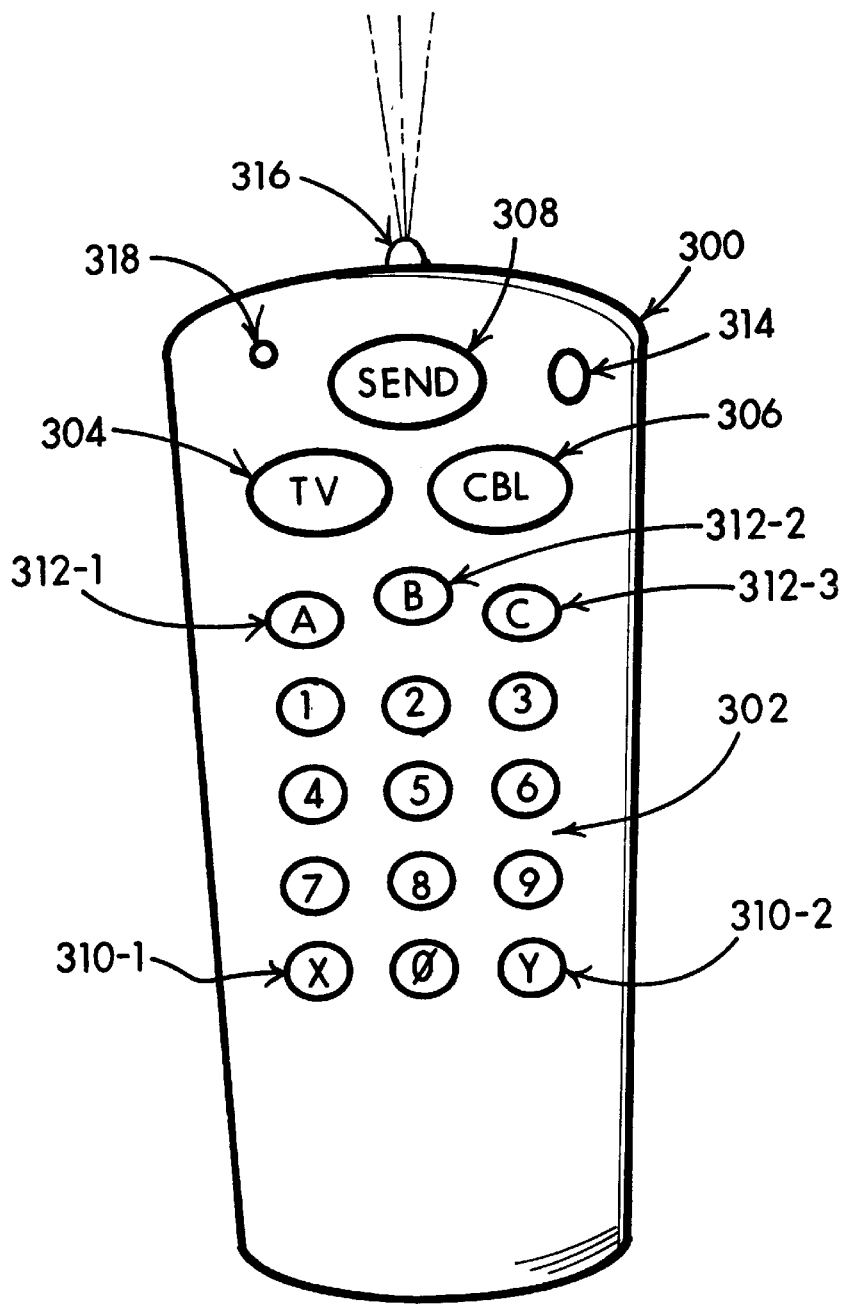
FIG. 13—Physical layout of a remote controller configured to include a SEND keybutton-for sending a sequence of "just entered" keypad entries and further configured to send a setup command signal in response to an extended activation of a device selection keybutton.

A generic layout illustrative of a universal remote controller 300 appears in FIG. 13. Many forms of universal remote controllers exist, with widely varying keypad layouts. This is merely a representative example of a rather minimal layout, showing its association with my invention. A keypad including at least ten numeric entry keys 302 is provided, usually for channel selection and setup code value entries. A TV keybutton 304 serves to select a televisor device, while a CBL keybutton 306 is used to select a cable box. A SEND keybutton 308 is included for sending channel selection keybutton entries, stored locally in a scratchpad memory, and sent as a rapid-fire series when the SEND button is pressed. The keypad may also include ancillary key functions such as MUTE 310-1 and MENU 310-2. Additionally, a PWR (power on/off) keybutton 314 is shown. Wireless coupling is attained using an infrared L.E.D. 316 and a confirmation of the wireless transmission may be confirmed by a visible L.E.D. 318.

Figure 14:
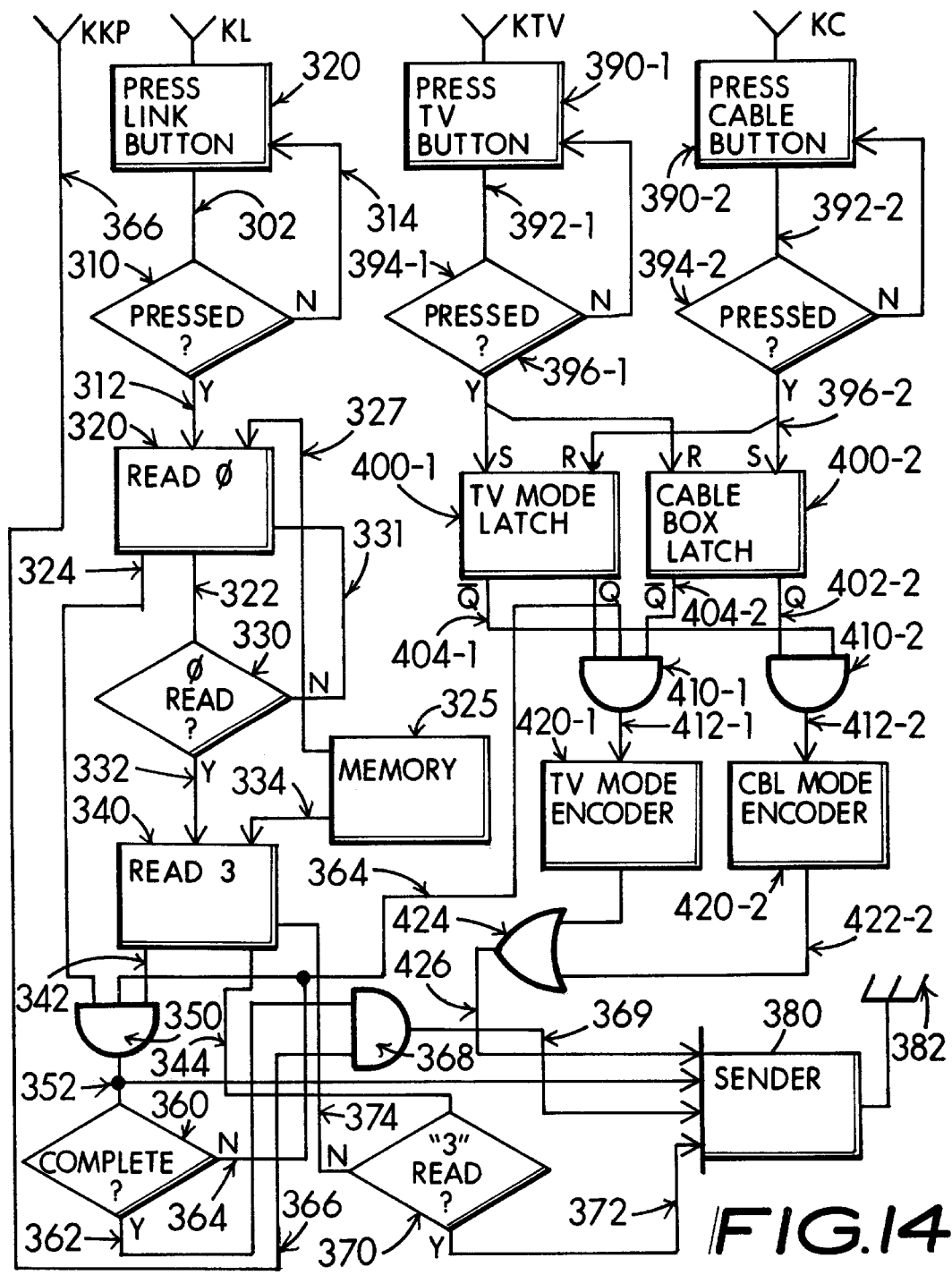
FIG. 14—Functional logic flow diagram showing operation of an automatic sending of a setup command in response to a LINK keybutton activation.

A signal flow chart for one explanatory embodiment for my invention next appears in FIG. 14. A number of keypad entries may be submitted by the user, including:

| | |
|---|---|
| KC = | CBL (cable box) Keybutton Entry |
| KKP = | Keypad 0–9 "numerical digit" entries |
| KL = | LINK Keybutton Entry |
| KTV = | TV (televisor) Keybutton Entry |
| KX = | VCR (VCR-machine or auxillary) device |

In the usual embodiment of my invention a keypress entry KL submits to the press link function function 320, resulting in signal on line 302, coupled with a "link button pressed?" decisor 310. In event the link button has been decisively pressed, a yes signal appears on line 312 and otherwise a NO signal appears on line 314 as looped back to the press link button function 320 (effectively scanning the keybutton state associated with the press link button 320). The resulting signal on line 312 serves to enable the "read $\emptyset$" function 320 to retrieve data 327 representing the value "$\emptyset$" channel selection precursor stored in the preceptive memory 325 and deliver it on line 322 to the "$\emptyset$ read?" decisor 330. The decisor delivers a YES signal on line 332 when the $\emptyset$ value is read, otherwise looping back on the NO line 334 awaiting the read value.

The YES signal on line 332 including the read $\emptyset$ value couples with the "read 3" function 340 which similarly retrieves 334 a data value for the channel 3 selection from the preceptive memory 325. An output line 344 originates from the function 340 which couples with the "3 read?" decisor 370. A YES signal couples with a sender 380 while a NO signal loops back 374 to the "read 3" function 349. Signals on line 324, 342 submit to AND function 350, together with a NO signal on line 364 delivered by the "complete?" decisor 360. When all three states satisfy the logic of device 350 a signal results on line 352 coupled with the sender 380 and the decisor 360. This confirmation enables the sender 380 to send a wireless command 382 to the remotely controlled apparatus.

Looking now, if the link keybutton KL is absent activity the signal on line 366 may couple through the AND function 368 and communicate individual keypad entries KKP to the sender 380 for transmission 382.

A TV device select keybutton entry KTV delivered to the "press TV button" function results in a signal on line 392-1 coupled with the decisor 394-1, resulting in a signal on line 396-1 coupled to the set input of latch 400-1 and the reset input of latch 400-2.

Similarly cable device CBL select keybutton entry KC delivered to the "press cable button" function results in a signal on line 392-2 coupled with the decisor 394-2, resulting in a signal on line 396-2 coupled to the reset input of latch 400-1 and the set input of latch 400-2.

An initial state for both latches 400-1,400-2 is where Q=untrue and/Q=true. A set input on line 396-1 denoting a keypress signal at port KTV establishes the line 402-1 Q=true while line 404-2 is held true and line 364 is untrue, albeit inverted as a true state at the input of the AND logic function 410-1. The result is a true state on line 412-1 urging the TV mode encoder 420-1 to deliver a signal through the OR function 424 with an input of the sender, establishing the sender's operating mode for encoding signals sent to the remotely controlled televisor.

Alternatively a set input on line 396-2 denoting a keypress signal at port KC establishes the line 402-2 Q=true while line 404-1 is held untrue and line 364, as mentioned is untrue but inverted at the input of the AND logic function 410-1. The result is a true state on line 412-2 urging the CBL mode encoder 420-2 to deliver a signal through the OR function 424 with the input of the sender, establishing the sender's operating mode for encoding signals sent to the remotely cable box.

Figure 15:
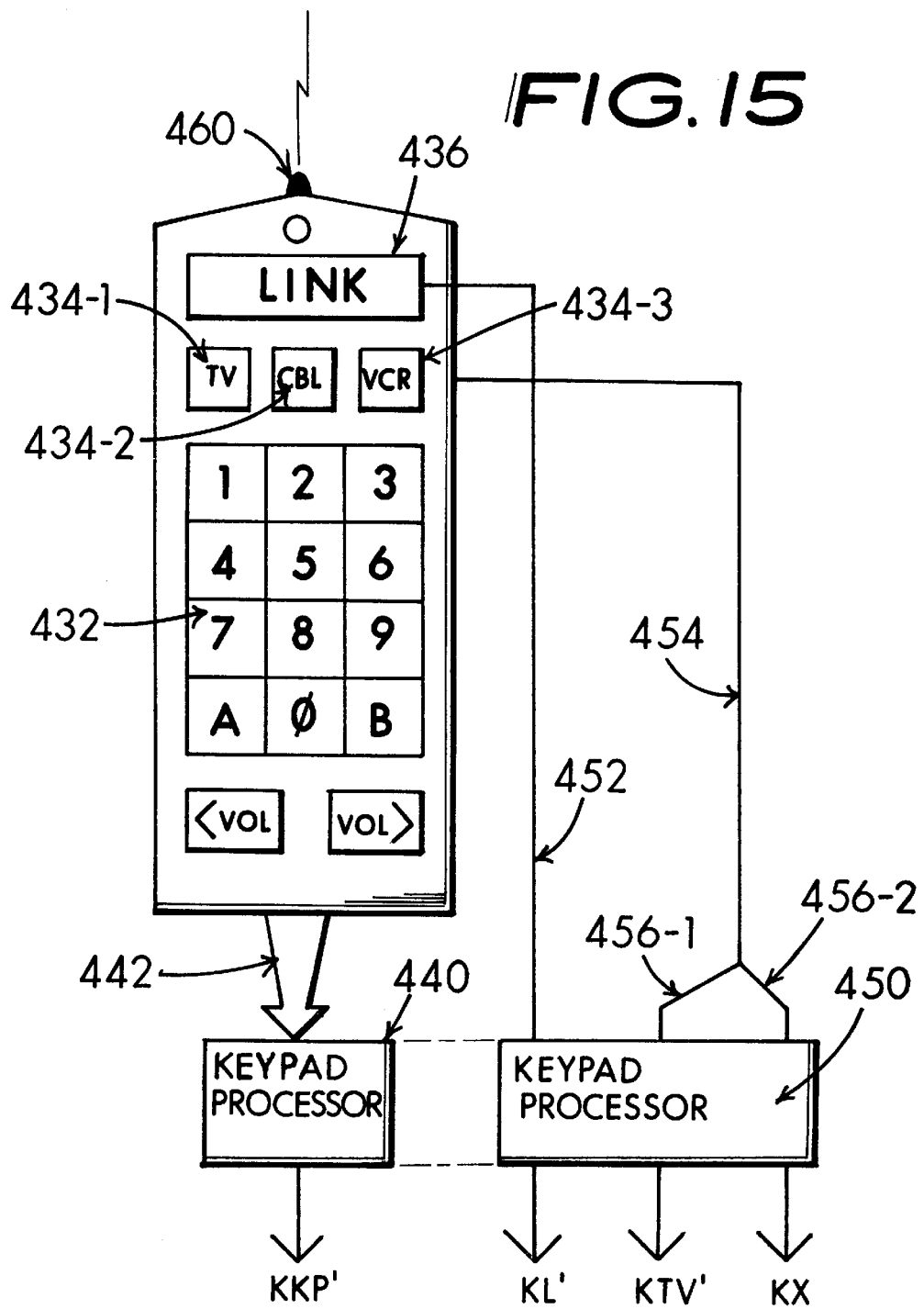
FIG. 15—An extension of the diagram of FIG. 14 including a keypad showing a LINK keybutton used to initiate sending of a setup command.

FIG. 15 is a showing of a remote controller 430 embodiment usable with FIG. 14. A keypad 432 offers a user opportunity for submitting any of a number of keypress activated entries, including ten numerical values $\emptyset$–9, etc. Additionally, I show three device selection keys 434-1,434-2,434-3 and a LINK (or SEND) key 436. As shown, the keypad 432 entries deploy signals over bus 442 with a keypad processor 440. As is well known practice, the keypad processor may scan the individual keys which may be arranged in an electrical matrix. In any event, kepresses may result in a weighted signal on line KKP' that couples with the corresponding input KKP of FIG. 14.

Likewise a pressing of one of the device selection keys 434-1,434-2,434-3 results in a correspondent signal on line 454 which spreads 456-1,456-2 between the keypad processor televisor selector and "other device X" selection as ushered forth from corresponding ports KTV' and KX', coupled with the inputs port KTV and KX of FIG. 14.

Similarly a user actuation (finger press) of the LINK keybutton 436 results in a signal on line 452 which couples through the keypad processor 450 with the port KL', delivering a LINK (or SEND) actuation signal to the input KL of FIG. 14. The overall result is that the wireless emitter 382 translates an infrared coupling beam from an L.E.D. 460, in accord with well known practice.

Figure 16:
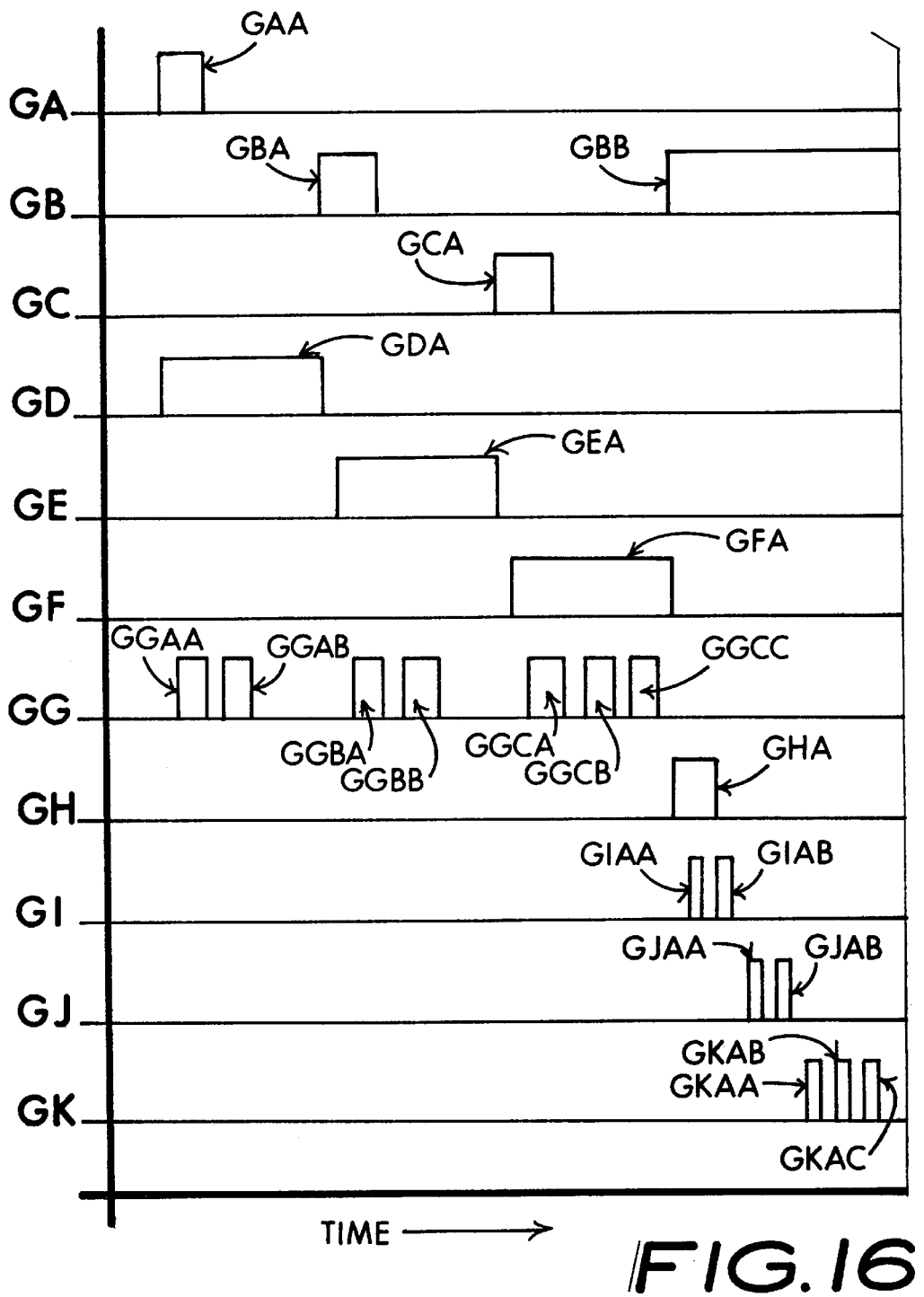
FIG. 16—Timing diagram showing the signal flow associated with the logic flow diagram of FIG. 14.

The essence of my invention's diversity is expressed in FIG. 16. I show on lines GA,GB and GC three possible device selections, say representing keys 434-1,434-2 and 434-3 of FIG. 15. Pressing the TV key 434-1 delivers a signal GAA on line GA which enables the TV device selection mode GDA on line GD. As a result, the viewer/user may key-in two or more keypad entries GGAA,GGAB on line GG through the keypad 432, wherein the entries are temporarily stored in a scratchpad memory or register.

Pressing the LINK button 436 results in a signal GHA on line GH that enables the remote controller's circuitry to urge sending of the temporarily stored instructions GGAA, GGAB as encoded signals GIAA,GIAB shown on line GI to the selected device and in this case, the televisor.

In a different selection, a pressing of the CBL key 434-2 delivers a signal GRA on line GB which enables the cable box device selection mode GEA to be entered on line GE. As a result, the viewer/user may key-in two or more keypad entries GGBA,GGBB on line GG through the keypad 432, wherein the entries are temporarily stored in a scratchpad memory or register.

Pressing the LINK button 436 results in a signal GHA on line GH that enables the remote controller's circuitry to urge sending of the temporarily stored instructions GGBA,GGBB as encoded signals GJAA,GJAB shown on line GJ to the selected device and in this case, the televisor.

Pressing the VCR key 434-3 delivers a signal GCA on line GC which enables the VCR-machine selection mode GFA on line GF. As a result, the viewer/user may key-in two or more keypad entries GGCA,GGCB,GGCC on line GG through the keypad 432 or otherwise, wherein the entries are temporarily stored in a scratchpad memory or held in a register.

Pressing the LINK button 436 results in a signal GHA on line GH that enables the remote controller's circuitry to urge sending of the temporarily stored instructions GGCA, GGCB,GGCC as encoded signals GKAA,GKAB,GKAC to the selected device and in this case, the VCR-machine.

Figure 17:
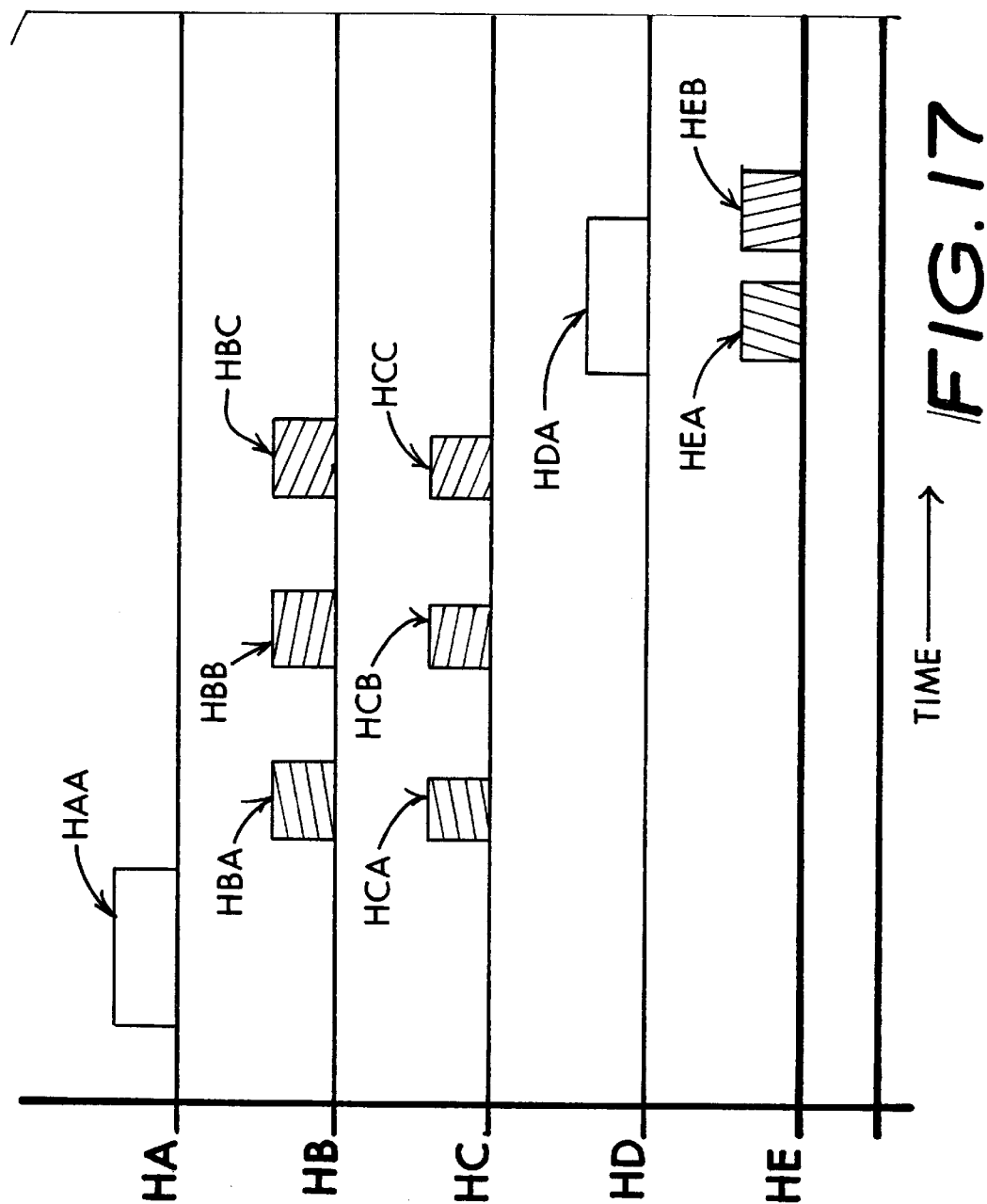
FIG. 17—Timing diagram expressing the most basic aspects of the invention.

Albeit somewhat of a reiteration of my present invention, FIG. 17 depicts a most basic user urged utilization for my invention. On line HA a user may select a device HAA, for example a cable box. The user may then make three keypad entries shown on line HB as "power" HBA, a first digit HBB and a second digit HBC. For example, if the user wants to tune the cable box to channel 26, the entered digits are HBB=2 and HBC=6. On line HC I show the result of the keypad entries depicted on line HB as a sending of the power command HCA, the channel selection digits HCB=2 and HCC=6.

A further showing is the user pressing the LINK button, shown on line HD as entry HDA. This action brings about the automatic sending of an interlink initialization channel selection signal to the televisor, shown on line HE as HEA=0 and HEB=3 for selection of channel 03 by the televisor's tuner.

With the advent of a commonplace practice for using a multitude of remotely controlled devices in immediate proximity of one-another, an issue of interference between commands sent to one device causing malfunction or misinterpretation in another device. For example, channel change commands sent to a VCR machine may cause erroneous changes in the setting of a televisor or cable box. This kind of cross-instruction interference is brought about by having a multitude of equipment each of which responds to many command encoded instructions. All that is needed is for a similarity to occur between the command sent to a first device and an interpretation (and not a rejection) of that same code intercepted by a second device. Bingo! An error command occurs. Sometimes this kind of command cross-talk is merely inconvenient but tolerable, under other circumstances it causes such substantial error that the devices become inoperative when used proximally.

Figure 18:
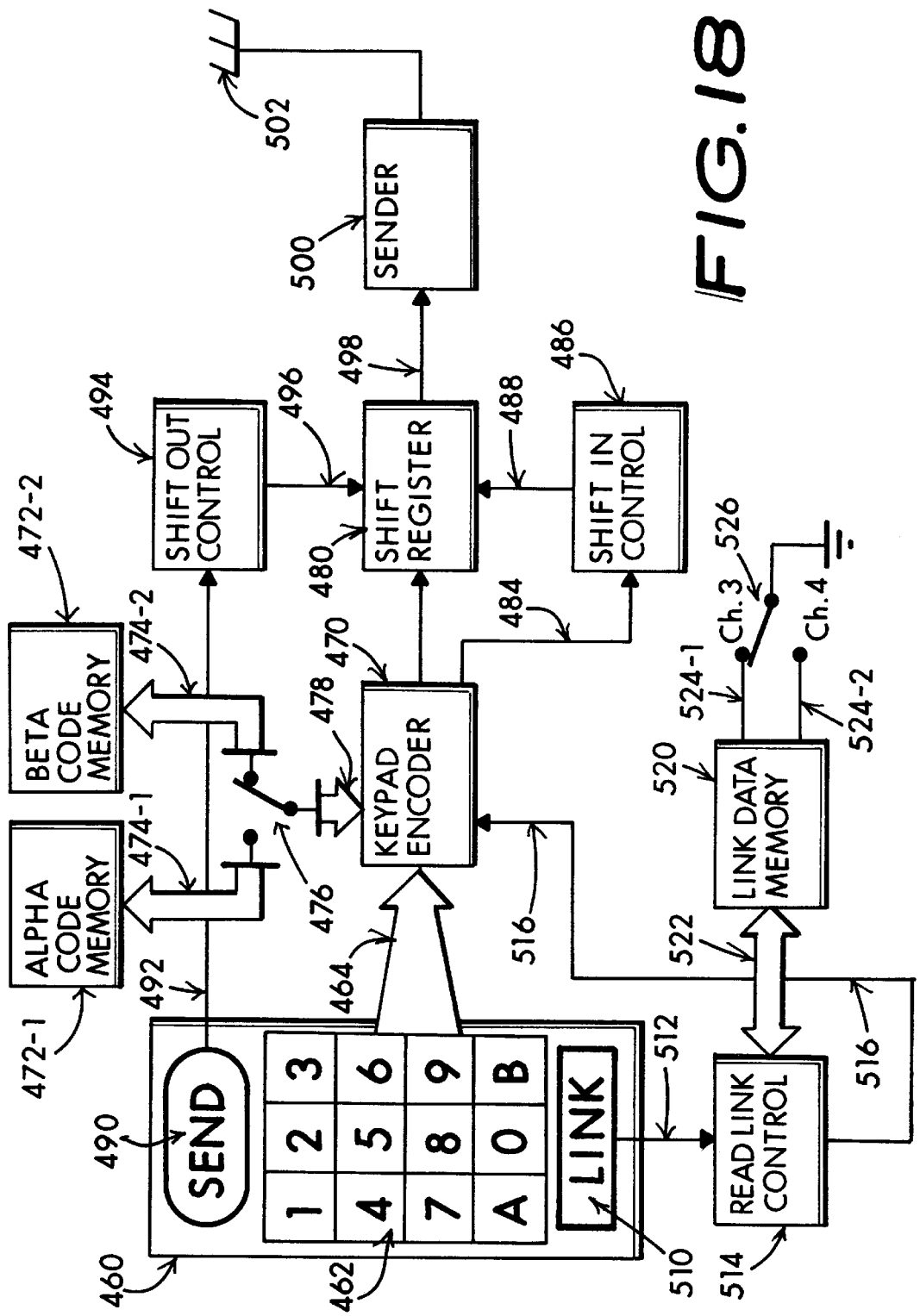
FIG. 18—A remote controller showing a selection of an alternate set of encoding memory selectable by a user in event of interference between an encoded command signal and another remotely controlled device.

In FIG. 18 I show a remote controller 460 including a keypad 462 which submits key entries on a data bus 464 to a keypad encoder 470. What I more importantly show in this FIG. 18 is the inclusion of an ALPHA code memory 472-1 and a BETA code memory 472-2. In effect the ALPHA memory and the BETA memory store a distinctly separate set of encoding data for use by the keypad encoder. The memory data delivered by each memory on bus connections 474-1,474-2 is "switched between" by a user actuatable (and usually hidden) setup switch 476. Typically this switch 476 may be a small limited-access "slide switch" located in the battery compartment of the remote controller 460. As a result either one or the other sets of encoding data are delivered on bus 478 to the keypad encoder. The resulting provision is that, if the encoding data delivered from the ALPHA code memory are interfering, the BETA code memory store of encoding data may instead be utilized in an attempt by the user to minimize or eliminate the command interference.

I show the encoded data signal is delivered on line 482 to a data input of a shift register 480. A keybutton entry signal also couples on line 484 with a shift-in control function 486 which couples 488 with the shift register to advance its storage facility by "one digit", thereby storing the most immediate keybutton entry as encoded data. For example, to select channel 46, a user may enter a 4 and a 6. The shift register 480 will first store the 4 and subsequently the 6 as two 4-bit nybbles or two 8-bit bytes of data (depending upon engineering considerations in the specific intercoupling of the shift register and related elements).

A SEND button 490 coupled by line 492 urges a shift-out control function 494 coupled 496 with the shift register to release the mentioned channel selection digits as data which are coupled on line 498 with a sender 500 for wireless translation 502 to a remotely controlled device. In effect, pressing the SEND button steps the shift register to "output" the stored channel selection values 4 and 6 as encoded binary words on line 498 in the manner of a FIFO memory.

I further show a LINK button 510 which may be actuated by a user, coupling 512 a signal with a read link memory function 514. The link memory 522 is fundamentally a determination of one of two or more preestablished states for setting up the distal remotely controlled device, and usually the televisor, to compatible intercoupling states relative with other devices. Most commonly, this may translate into affirming a setting of the televisor's tuner on channel 3 or channel 4. The selection of which state is sought is determined by a presettable switch 526 coupled 524-1,524-2 with the link memory 520. The result is a delivery of data on line 516 which are representative of the necessary interlink setup command, for example channel 3. Hence, the data on line 516 may represent binary words weighted by the leading-zero formatted channel selection values 03. A signal on line 518 delivered from the read link memory function 514 also urges the shift out control 494 to presently read-out the encoded link memory command data and submit it to the remotely controlled device (and usually the televisor) using the sender 500.

Figure 19:
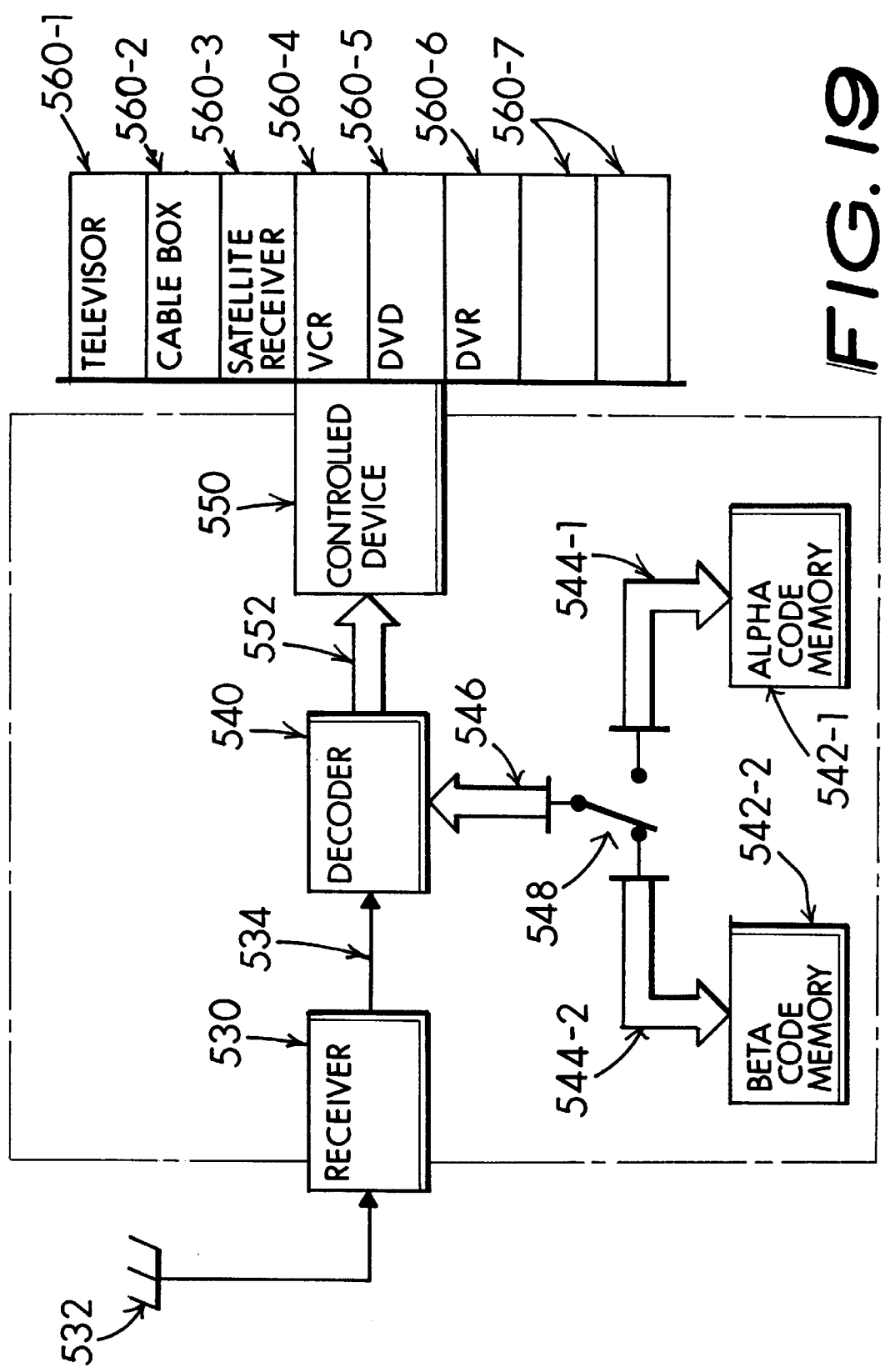
FIG. 19—A receiver for a remotely control command including alternate decoding selection to conform with the encoding submitted by the remote controller of FIG. 17.

A remotely controlled device incorporating my invention's interference reduction scheme appears in FIG. 19. A "receiver" 530 intercepts 532 a stream of encoded data which are sent 502 from the remote controller 460. The receiver delivers the encoded signal 534 to a decoder 540. I show an ALPHA code memory 542-1 and BETA code memory 542-2 coupled 544-1,544-2 with a switch 548 and thence by a data bus 546 with the decoder 540. Realize that the ALPHA and BETA code memory data stored in memories 542-1,542-2 are reflective of the correspondent ALPHA and BETA code stored in memories 472-1,472-2 (of FIG. 18). In practice, the switch 548 selection is compatibly set to agree with the switch 476 selection. The result is a decoded command signal on bus 552 that couples with a controlled device 550, shown to typically include one of a televisor 560-1, cable box 560-2, satellite receiver 560-3, VCR machine 560-4, DVD machine 560-5, DVR machine 560-6 or any one of a plethora of other remotely control video and audio entertainment, or home theater, devices 560-7.

I anticipate and even expect that a skilled artisan may develop the details of my invention's implementation methodology with considerable variation regarding hookup, arrangement of elements, hardware details and even operational preferences. Such alternate schemes result from mere application of retroversive engineering skill coupled with the plethora of parts, components and known mechanisms which might be utilized to construct or concoct practical apparatus and in particular remote controllers according to the underlying teachings of my invention.

It shall therefore be understood that whatever choice of components, component values, elemental intercoupling, physical configuration, power source, wireless technique, keypad arrangement, encoding scheme and similar matters of style or technique shall be unequivocally construed as mere engineering choices or options utilized to satisfy product goals for a specific application and embodiment for my invention's underlying novelty and that such choices shall be considered fully within the scope and operative intent of my claimed invention.

I claim for my invention:

1. A remote controller method including a keypad entry for device selection and functional instruction and comprising steps of:

presently selecting a command mode for one of at least two remotely controlled devices;

first entering a user preferred functional instruction command into the keypad;

sending the user preferred functional instruction command to the presently selected said remotely controlled device;

manually actuating a first dedicated keybutton switch;

overriding the presently selected remotely controlled device with a priority selection of a predesignated device in a measured response to the manual actuation of the first dedicated keybutton;

sending a preceptive setup command to the predesignated device; and, returning the presently selected command mode preexisting the manual actuation of the first dedicated keybutton.

2. The remote controller method of claim 1 comprising further steps of:

intercoupling a first video signal interlink between a first video signal output of a first said remotely controlled device and a first video signal input of a second said remotely controlled device;

first pretuning the first video signal output tuning to the preset channel;

first setting the first video signal input tuning to match the preset channel; and, affirming the first setting of the first video signal input tuning to coincide with a preset channel selection defined by the preceptive setup command urged by the remote controller.

3. The remote controller method of claim 1 comprising a further step of:

maintaining data representing the preceptive setup command in a preceptive data memory; and, reading the preceptive setup command stored in the preceptive data memory in immediate response to the manual actuation of the first dedicated keybutton.

4. The remote controller method of claim 1 comprising further steps of:

intercoupling a first video signal interlink between a first video output of a first remotely controlled device and the first video input of a second remotely controlled device;

pretuning the first video signal output to a predetermined interlink channel defined by the user preferred functional instruction command; and, said sending the preceptive setup command to establish tuning of the first video signal input to the interlink channel.

5. The remote controller method of claim 1 comprising further steps of:

intercoupling a first video signal interlink between a first video output of a first remotely controlled device and the first video input of a second remotely controlled device;

pretuning the first video signal output to a predetermined interlink channel;

said sending the preceptive setup command to establish a tuning of the first video signal input to the interlink channel;

assigning the first dedicated keybutton switch for manual actuation to assert the sending of the preceptive setup command;

first asserting the preceptive setup command to comprise a selection of the second remotely controlled device and affirming the first video input tuning to the predetermined interlink channel; and, whereby manual actuation of the dedicated keybutton switch serves to submit the interlink selection command, as usually one of channel 3 and channel 4, with exclusive priority to the second remotely controlled device.

6. The remote controller method of claim 5 comprising further steps of:

overriding an immediate device selection upon the actuation of the dedicated keybutton switch concurrent with the exclusive priority selection of the second remotely controlled device;

said submitting the preceptive setup command to the second remotely controlled device; and, immediately returning to the device selection preexisting the submission of the preceptive setup command to the second remotely controlled device.

7. The remote controller method of claim 1 comprising further steps of:

establishing the predesignated device selection to include actuation of a televisor selection or TV selection key;

predefining setup of the remote controller to define the TV selection key actuation to include the automatic sending of the preceptive setup command as a preset channel selection command to the televisor; and, ordering affirmative tuning of the first video signal input port comprising the televisor to be set to conform with the preset channel selection command usually as one of channel 3 and channel 4.

8. The remote controller method of claim 1 comprising further steps of:

said entering the user preferred functional instruction command as usually a plurality of individually selected keypad entries;

temporarily accumulating the individually selected keypad entries as a sequence of selection data stored in a register;

manually actuating a second dedicated keybutton switch;

retrieving the stored sequence of selection data from the register in subsequential response to the manual actuation of the second dedicated keybutton switch;

said sending the user preferred functional instruction command characterized by the retrieved sequence of stored selection data in further response to the manual actuation of the second dedicated keybutton; and, whereby the user may complete an entry sequence for the several individually selected keypad entries prior to actuation of the second dedicated keybutton and the sending of the user preferred functional selection command to the presently selected said remotely controlled device.

9. The remote controller method of claim 1 comprising further steps of:

configuring the keypad to include at least two user actuatable device selection keybuttons;

assigning one of the device selection keybuttons as the first designated keybutton to functionally select the predesignated device;

obtaining a momentary user actuation of the designated keybutton to immediately select and enable the sending of the user preferred functional instruction commands to the predesignated device; and, maintaining user urged actuation of the designated keybutton in excess of a finite period of time and usually at least one second whereupon the preceptive setup command is automatically sent to the predesignated device.

10. The remote controller method of claim 1 comprising further steps of:

defining the first dedicated keybutton switch as comprising a device selection keybutton;

said selecting the command mode for the predesignated device determined by the manual actuation of the device selection keybutton;

commencing a first timing interval with an onset of the manual actuation of the first dedicated keybutton;

said sending the preceptive setup command to the predesignated device in an automatic response to a maintaining of the manual actuation of the device selection keybutton for a time period measurably exceeding the first timing interval; and, whereby each of the device selection entries may include a provision for sending a preceptive instruction to a corresponding device.

11. A remote controller method comprising steps of:

first associating a remotely controlled apparatus comprising a televisor and an ancillary device;

first linking an intermediate video signal coupled between the ancillary device's output port and the televisor's input port;

first presetting a carrier frequency of the intermediate video signal delivered by the ancillary device to a predetermined channel and usually selected as one of channel 3 and channel 4;

configuring a portable remote controller to include a keypad port enabling a user to manually enter and first send device selection and channel tuning commands to at least one of the devices comprising the remotely controlled apparatus;

configuring the portable remote controller to include a user actuatable first dedicated keybutton operated switch to enable the user to particularly send a preceptive function signal to the televisor for affirming an immediate tuning of the televisor's input port to preferably match the first preset carrier frequency of the intermediate video signal.

12. The remote controller method of claim 11 wherein the predetermined channel selection command comprises further steps of:

first encoding the preceptive function signal to particularly select the televisor; and, second encoding the preceptive function signal to effect an immediate tuning of the televisor's input port to match the intermediate video signal's said first preset carrier frequency.

13. The remote controller method of claim 11 further comprising steps of:

designating the first dedicated keybutton as a preferably singular keybutton actuated switch privately assigned to affirming an interlink setup mode and interlink channel selection compliance between a source of interlink signal delivered by the ancillary device and the televisor's input port.

14. The remote controller method of claim 11 further comprising steps of:

temporarily storing the device selection and the channel tuning commands that are said manually entered by the user as first command data in a register;

configuring a user actuatable second keybutton operated switch;

subsequently retrieving the first command data in immediate response to a user urged actuation of the second keybutton operated switch;

immediately sending a command signal sequence to at least one of the devices comprising the remotely controlled apparatus, thereby conveying the device selection and the channel tuning commands temporarily stored in and subsequently retrieved from the register.

15. The remote controller method of claim 11 further comprising steps of:

configuring the portable remote controller to include a plurality of separate manually actuatable device selection keybuttons including one designated for selecting the televisor;

momentarily actuating the device selection keybutton assigned to selection of the televisor thereby enabling a sending of user preferred channel tuning commands to the televisor; and, maintaining user urged actuation of the televisor designated device selection keybutton for a finite period of time usually exceeding one second thereby enabling a sending of the predetermined channel command to the televisor.

16. A remote controller apparatus comprising:

a first keypad data entry means comprising a first switch means including a plurality of individually operable user accessible keybutton switches which may be manually actuated in concert to select and to initiate an immediate and usually multi-digit command function to implement control at least one of a televisor and an ancillary device ordinarily coupled with the televisor; and, a manually actuatable second switch means which may initiate translation of a preceptive function signal to the televisor;

a wireless sender means first modulated by a first set of uniquely encoded command signals comprising the immediate command function and operational to link a first set of wireless commands with at least one of the televisor and the ancillary device; and, the wireless sender means second modulated by a second set of uniquely encoded command signals comprising the preceptive function signal and operational to link a second set of wireless commands exclusively with the televisor to assert an immediate extent of interface signal compatibility between the televisor video signal input port and the ancillary device's video signal output port.

17. The remote controller apparatus of claim 16 adapted to overcome data entry failure caused by a lapse of excessive time delay between individual digits submitted using the first keypad data entry means to enter the multi-digit command function and further comprising:

a memory means for temporarily storing the multi-digit command data as an ordered representation of the first set of uniquely encoded command signals;

a manually actuatable third switch means;

a memory readout means responsive to a user entered manual actuation of the third switch means and effective for encouraging an orderly retrieval of the temporarily stored multi-digit command data from the memory means;

a combinatorial means for formatting the retrieved said temporarily stored multi-digit command data into the first set of uniquely encoded command signals;

the wireless sender means said first modulated by the retrieved and formatted said first set of uniquely encoded command signals; and, whereby the user may deliberately enter two or more selection digits comprising the multi-digit command function which are immediately accumulated in a temporary memory and upon completion of the entry of the digits, a separate keybutton is manually actuated which operates the third switch, commencing an ordered readout of the temporarily stored data and an immediately urging of a sending of the temporarily stored data as a rapid-fire multi-digit sequential wireless transmission to establish the multi-digit command function relative with the remotely controlled ancillary device.

18. The remote controller apparatus of claim 16 further comprising:

the second switch means identified for particularly selecting the televisor and usually marked TV and to include a first extent of actuation and a second extent of actuation exceeding the first;

a first signal processor receptive to the first extent of actuation to first deliver a televisor selection signal;

a second signal processor receptive to the second extent of actuation to second deliver the second set of uniquely encoded command signals to said second modulate the wireless sender means; and, wherein a manual partial actuation of the second switch means solely selects the televisor and enables the user to utilize the first keyboard means to subsequently further select and urge wireless linking of the first set of wireless commands with the televisor, and the manual full actuation of the second switch means automatically links the second set of wireless commands with the solely selected televisor.

19. The remote controller apparatus of claim 16 further comprising:

the second switch means identified for particularly selecting the televisor and usually marked TV;

a first timer means initiated concurrent with an actuation of the second switch means and configured to define elapse of a finite period of time;

a first signal processor receptive to actuation of the second switch means to first deliver a televisor selection signal;

a second signal processor responsive to a maintained actuation of the second switch means for an indefinite period of time, at least exceeding the finite period of time defined by the first timer means, to second deliver the second set of uniquely encoded command signals to said second modulate the wireless sender means; and, wherein a manual actuation of the second switch means for a first period of time measurably less than the finite period of time solely selects the televisor and enables the user to utilize the first keyboard means to subsequently further select and urge wireless linking of the first set of wireless commands with the televisor, and a maintained manual actuation of the second switch means for a second period of time measurably exceeding the finite period of time automatically links the second set of wireless commands with the solely selected televisor.

20. The remote controller apparatus of claim 16 further comprising:

a first logic means responsive to a selection of an ancillary device and for automatically initiating the wireless sending of preceptive function signal to the televisor in automatic response to the manual actuation of at least one of the individual keybutton switches comprising the first switch means; and, wherein an assertion of the immediate correspondence in channel selection tuning between the televisor video signal input port and the ancillary device's video signal output port is automatically affirmed concurrent with every first set of wireless commands sent to the selected ancillary device.

* * * * *